US012263819B2

(12) United States Patent
Leiber

(10) Patent No.: US 12,263,819 B2
(45) Date of Patent: Apr. 1, 2025

(54) VEHICLE AXLE HAVING ELECTRIC DRIVE MOTORS, AN ELECTROHYDRAULIC BRAKE AND ADDITIONAL MODULES SUCH AS A TRANSMISSION, TORQUE VECTORING AND A PARKING BRAKE

(71) Applicants: IPGATE AG, Pfäffikon (CH); LSP Innovative Automotive Systems GmbH, Unterföhring (DE)

(72) Inventor: Thomas Leiber, Rogoznica (HR)

(73) Assignees: IPGATE AG, Pfäffikon Ch (CH); LSP INNOVATIVE AUTOMOTIVE SYSTEMS GMBH, Unterföhring (DE)

( * ) Notice: Subject to any disclaimer, the term of this patent is extended or adjusted under 35 U.S.C. 154(b) by 0 days.

(21) Appl. No.: 18/628,001

(22) Filed: Apr. 5, 2024

(65) Prior Publication Data

US 2024/0300463 A1 Sep. 12, 2024

Related U.S. Application Data

(63) Continuation of application No. 17/415,294, filed as application No. PCT/EP2019/086870 on Dec. 20, 2019, now Pat. No. 12,084,012.

(30) Foreign Application Priority Data

Dec. 20, 2018 (DE) .................. 10 2018 133 223.8

(51) Int. Cl.
*B60T 13/58* (2006.01)
*B60T 8/1755* (2006.01)
*B60T 13/74* (2006.01)

(52) U.S. Cl.
CPC .......... *B60T 13/588* (2013.01); *B60T 13/745* (2013.01); *B60T 8/1755* (2013.01); *B60T 2270/402* (2013.01)

(58) Field of Classification Search
CPC .... B60T 13/588; B60T 8/1755; B60T 13/745; B60T 2270/402
See application file for complete search history.

(56) References Cited

U.S. PATENT DOCUMENTS

| | | | |
|---|---|---|---|
| 5,758,930 | A | 6/1998 | Schiel et al. |
| 10,988,124 | B2 | 4/2021 | Besier et al. |

(Continued)

FOREIGN PATENT DOCUMENTS

| | | |
|---|---|---|
| AT | 12010 U2 | 9/2011 |
| CN | 101039829 A | 9/2007 |

(Continued)

OTHER PUBLICATIONS

Translation of German Patent No. DE 3424912 obtained from website: https://worldwide.espacenet.com on Jul. 9, 2024.*

(Continued)

*Primary Examiner* — Pamela Rodriguez
(74) *Attorney, Agent, or Firm* — Panitch Schwarze Belisario & Nadel LLP

(57) ABSTRACT

A vehicle axle may include hydraulically operating wheel brakes and/or additional hydraulic loads, such as clutch plate cylinders. The vehicle axle may include at least one pressure supply device, driven by an electric-motor drive, to control pressure in the wheel brakes; at least one control and regulating device; a valve assembly having values for setting wheel-specific brake pressures and/or for disconnecting/connecting the wheel brakes from/to the pressure supply device, and at least one electric drive motor for driving and braking a vehicle wheel or the axle. At least one pressure supply device is used to control the pressure of and/or provide pressure to at least one additional brake unit in the form of an electric parking brake, a hydraulically supported electromechanical brake, an electromechanical brake and/or (Continued)

Figure 1A:
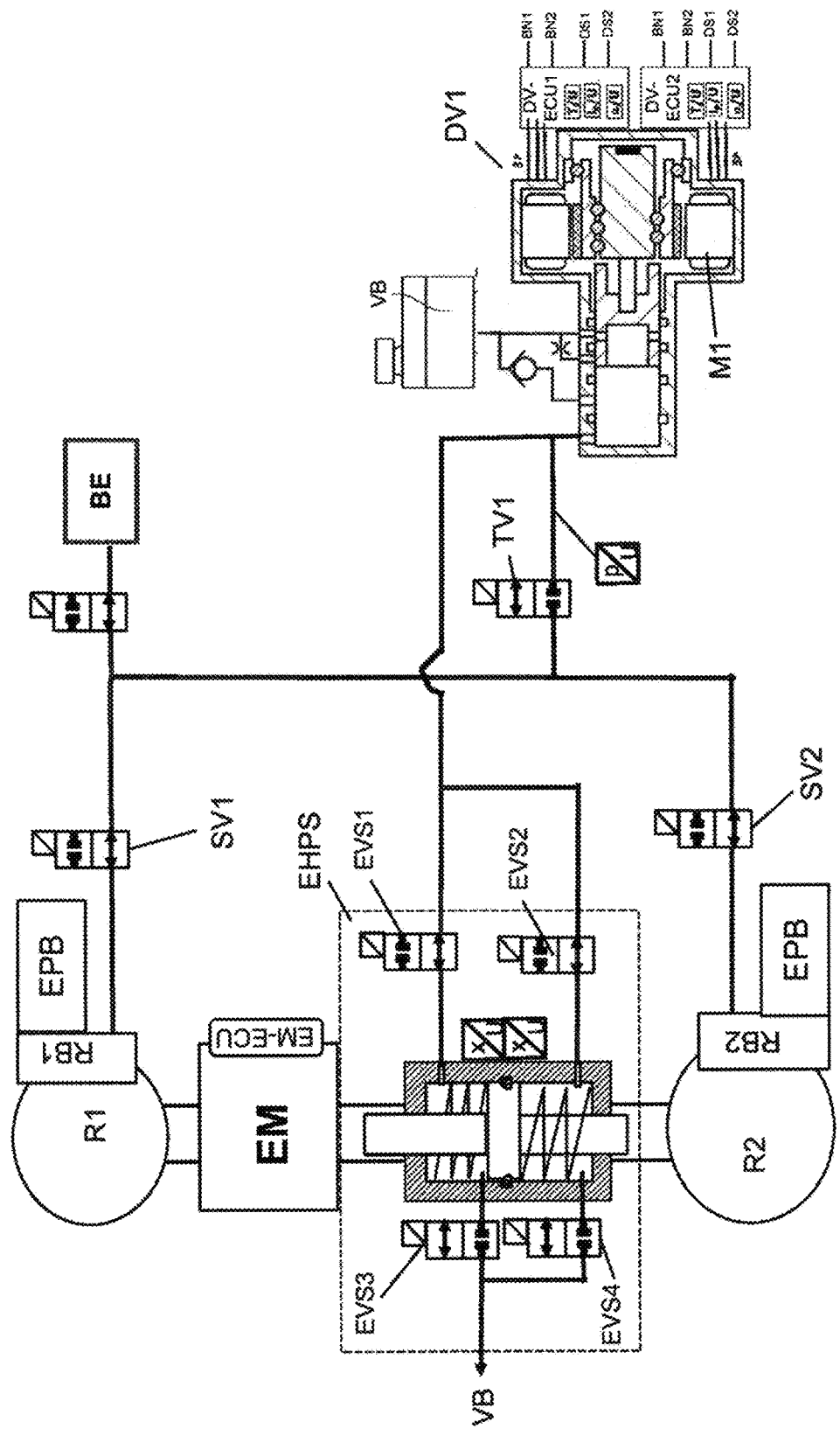

a force-supporting steering device, a gear actuator and/or transmission actuator, and/or a torque vectoring module.

19 Claims, 16 Drawing Sheets

(56) References Cited

U.S. PATENT DOCUMENTS

| | | |
|---|---|---|
| 2008/0197738 A1 | 8/2008 | Leiber et al. |
| 2009/0115247 A1 | 5/2009 | Leiber et al. |
| 2012/0013173 A1 | 1/2012 | Leiber et al. |
| 2012/0299367 A1 | 11/2012 | Ross et al. |
| 2015/0375726 A1 | 12/2015 | Roll et al. |
| 2016/0009263 A1 | 1/2016 | Feigel et al. |
| 2018/0043873 A1 | 2/2018 | Tanimoto |
| 2022/0055592 A1 | 2/2022 | Leiber |

FOREIGN PATENT DOCUMENTS

| | | |
|---|---|---|
| CN | 101039830 A | 9/2007 |
| CN | 104203665 A | 12/2014 |
| CN | 107472232 A | 12/2017 |
| CN | 113771822 A | 12/2021 |
| DE | 34 24 912 25 A1 | 1/1986 |
| DE | 10223847 A1 | 1/2003 |
| DE | 102005055751 A1 | 11/2006 |
| DE | 102008049739 A1 | 4/2010 |
| DE | 102011084206 A1 | 4/2012 |
| DE | 10 2013 224313 A1 | 9/2014 |
| DE | 102013217954 A1 | 3/2015 |
| DE | 102013224776 A1 | 6/2015 |
| DE | 102014117726 A1 | 6/2016 |
| DE | 202015008975 U1 | 6/2016 |
| DE | 202015008976 U1 | 7/2016 |
| DE | 112009005541 B3 | 8/2017 |
| DE | 102016203563 A1 | 9/2017 |
| DE | 102016225537 A1 | 6/2018 |
| DE | 102005018649 B4 | 10/2018 |
| DE | 102017111077 A1 | 11/2018 |
| DE | 102017114556 A1 | 1/2019 |
| EP | 1874602 B1 | 12/2012 |
| EP | 1759447 B1 | 7/2013 |
| EP | 2396202 B1 | 4/2015 |
| EP | 3208162 A1 | 8/2017 |
| KR | 2017 0049878 A | 5/2017 |
| WO | 2013140221 A1 | 9/2013 |
| WO | 2015032637 A1 | 3/2015 |
| WO | 2016146223 A2 | 9/2016 |

OTHER PUBLICATIONS

Search Report issued Oct. 7, 2019 in DE Application No. 10 2018 133 223.8.

Int'l Search Report and Written Opinion issued Feb. 18, 2020 in Int'l Application No. PCT/EP2019/086870, translation of Int'l Search Report only.

Office Action and Search Report issued May 31, 2023 in CN Application No. 201980092241.4 (English Translation).

Partial European Search Report issued Oct. 11, 2024 in European Application No. 24188961.7 (Partial English Translation).

Extended European Search Report issued on Feb. 3, 2025, in EP Application No. 24188961.7.

Office Action issued on Jan. 3, 2025, in CN Application No. 202410228650.5.

\* cited by examiner

VEHICLE AXLE HAVING ELECTRIC DRIVE MOTORS, AN ELECTROHYDRAULIC BRAKE AND ADDITIONAL MODULES SUCH AS A TRANSMISSION, TORQUE VECTORING AND A PARKING BRAKE

CROSS-REFERENCE TO RELATED APPLICATION

This application is a continuation of U.S. patent application Ser. No. 17/415,294, filed on Jun. 17, 2021, which is a Section 371 of International Application No. PCT/EP2019/086870, filed Dec. 20, 2019, which was published in the German language on Jun. 25, 2020 under International Publication No. WO 2020/128081 A1, which claims priority under 35 U.S.C. § 119(b) to German Patent Application No. 10 2018 133 223.8, filed Dec. 20, 2018, the disclosures of which are incorporated herein by reference.

DESCRIPTION

The present invention relates to a device for an electric axle for electric vehicles, in particular designed for vehicles in increasing autonomous driving operation

PRIOR ART

The automotive industry is undergoing a disruptive change process. In addition to the increasing market penetration of electric vehicles, various stages of automated driving are being passed through, these are initially: Level 3—highly automated driving—HAD, level 4—fully automated driving—FAD, and level 5—autonomous driving—AD with each level increasing the demands on the braking systems used.

This has driven the development of new braking systems forward. The replacement of vacuum brake boosters with electric brake boosters (e-BKV) began in 2005 after initial approaches [ATZ edition 6/11] with the market launch of what are termed 2-box solutions with electrical slave brake boosters and an additional ESP unit in 2013 [ATZ edition 4/18] followed shortly by the first integrated 1-box systems with pedal simulators in 2017 [Bremsenhandbuch—Chapter 20]. Solutions for level 3 (HAD) are currently being developed.

From level 3 (HAD), a redundant pressure supply is mandatory for the first time. In addition, a connection between the brake circuits and the reservoir should be avoided as far as possible in the case of open braking systems, and pedal feel simulators with constant pedal characteristics should be used. A redundancy of the ABS function must also be provided. This is implemented in what are termed 2-box systems with electric brake boosters and an ESP/ABS unit according to the prior art according to DE112009005541B3 in such a way that the electric brake booster (e-BKV) takes over a pressure modulation function in the event of failure of the ESP unit in order to always ensure high vehicle deceleration. In the first step, what is termed an "ABS select-low control" was introduced.

From level 4 (FAD), 3-fold redundancies are expected for sufficient system availability, e.g., with the pedal sensors with the rule "2 out of 3". In addition, a pedal simulator is essential because of the increasing recuperation performance of electric vehicles and a lack of acceptance of changes in the pedal characteristics because fully automatic driving (FAD) can be operated over a longer period of time and the vehicle driver is not prepared for a change in the pedal characteristics when switching to piloted driving. To monitor the pressure supply, a redundant pressure transducer must be provided or an alternative diagnostic option must be provided. A redundant ABS function with at least individual axle control will also be required and partial redundancies will be introduced. Braking systems with closed brake circuits in ABS operation have safety advantages.

In level 5 (AD), the pedal position sensor and pedal simulator and their characteristics are no longer relevant. In contrast, the remaining components and subsystems will have triple redundancy, with the rule "2 out of 3" for sensors, control and regulating units ECU and part-ECU, or multiple redundancy. In addition, complete redundancy must be provided for the individual wheel control.

Several new vehicle manufacturers such as Apple, Uber and Waymo are working on completely autonomous vehicles without a vehicle driver, which in the first expansion stage have a brake pedal with a simple pedal feel simulator unit (level 4 FAD) and in the last expansion stage (level 5 AD) should no longer have a brake pedal. In addition, vehicles with powerful electric drive motors on both the rear and front axles are becoming increasingly popular.

In addition to the electrohydraulic braking systems described, the electromechanical brake (EMB, electromechanical wedge brake) is a known solution. The EMB has not caught on in the past due to safety concerns and high costs. The high costs are due in particular to the fact that an electric motor and a complex electromechanical mechanism are required for each wheel brake. In addition, an EMB has a large number of electrical contact points, which are known to be more prone to faults than hydraulic lines.

For reasons of cost and reliability, braking systems for the FAD and AD levels cannot exclusively have EMB or wedge brakes. An EMB is only suitable for the rear axle of a vehicle because the rear axle has a smaller share of the braking force and a failure is not viewed as critically as on the front axle. A hydraulic braking system with control in the predominantly closed brake circuit via an electrically driven piston-cylinder unit is thus preferred.

In DE102005055751B4 and DE102005018649B4, the high-precision piston pressure control (PPC) is implemented by means of an electrically driven piston-cylinder unit having a spindle drive. The pressure is controlled using a non-linear map, what is termed the pressure-volume characteristic, in which the relationship between pressure and piston position is evaluated. Alternatively or additionally, the pressure is used by phase current control of the electric motor, the physical relationship of proportionality between current to torque and, due to a known piston area and fixed gear ratio, proportionality between current and pressure also existing and being used. With these two parameters, the pressure and the pressure change curve can be controlled very precisely.

In EP1874602B1 and EP2396202B1 what is termed the multiplex method (MUX) is described, which is particularly suitable for the requirements of levels 4 and 5 since a closed braking system, as explained later, does not have any dormant faults. In addition, a plurality of wheel brakes can be pressurized and depressurized with only one switching valve each, either simultaneously or one after the other. The high dynamic demands on the electric motor are disadvantageous, in particular if all wheel brakes are controlled by one motor. This requires a special motor with a double air gap such as is known from EP1759447B1 or a motor with a very low inertia mass.

In WO201614622A2 a special valve circuit of switching valves is also implemented, where the interior of the switching valve is connected to the associated brake circuit via a hydraulic line and the valve seat compensation is connected to the associated wheel brake via a hydraulic line. This valve switching is particularly suitable for the MUX method with only one switching valve per brake circuit, since in the event of a fault the solenoid valve opens due to the pressure in the wheel brake and thus prevents the pressure from remaining locked in the wheel brake, which leads to undesired vehicle deceleration.

Certain components of braking systems are to be regarded as critical to safety. These are seals for pistons, solenoid valves and ball screw drives. Various faults and their effects are listed below:

Piston: Piston seals can fail, although the leakage may not yet occur at low pressures, for example, but only at high pressures. Leakage leads to a failure of the piston function. Pistons are used in path simulators, pressure supplies and master brake cylinders (HZ) and can lead to pedal failure or failure of the pressure supply.

Solenoid valves: Dirt particles can settle in the valve seat. If solenoid valves in an open braking system are connected to the reservoir, for example, particles can settle when they close and the connection is not tight. The tightness cannot be diagnosed when open.

Ball screw drive: Ball screw drives wear out over their service life and can jam, in particular if dirt particles get into the ball screw drive. This can lead to failure of the pressure supply.

The requirements for level 3 (HAD), level 4 (FAD) and level 5 (AD) braking systems and for e-vehicles that have increasingly powerful electric drive motors on one or more axles can be summarized as follows:

completely noiseless operation, i.e., no disturbing noises from units on the bulkhead;

even shorter construction than conventional cars due to new vehicle platform concepts for electric vehicles;

brake intervention for individual wheels or axles, even in the event of complete or partial failure of modules;

functional scope ABS, ESP, ASR, recuperation and torque vectoring with the least possible restriction of performance even in the event of complete or partial failure of modules;

maximum recuperation of the vehicle's kinetic energy through maximum utilization of the braking power by electric motors; therefore dynamic and precise control of the hydraulic braking system as required;

use of available braking torques, e.g., from drive motors to simplify the braking systems or shorten the braking distance;

increased safety through redundancy of the systems, signal transmission and power supply;

diagnostic methods for detecting leaks or avoiding dormant faults;

high demands on the control accuracy for further braking distance reduction, in particular when electric drive motors and hydraulic braking torques work together;

high modularity of the systems, i.e., the use of the same parts/modules, in particular for the pressure supply; modularity is driven by a large number of vehicle drive concepts, in particular in the coexistence of vehicles with internal combustion engines, hybrid vehicles and pure electric vehicles (internal combustion engines, hybrid engines, pure electric vehicles, driverless vehicles).

Now that electric vehicles are increasingly establishing themselves on the market, electric axle concepts are becoming increasingly popular. There, electric motors are an integral part of one or more axles, and axle concepts with integrated electric motors are increasingly being offered by various suppliers as part of the platforms of electric vehicles. This achieves maximum flexibility in vehicle design and vehicles can implement new vehicle interior concepts because the internal combustion engine is no longer a length-limiting factor.

In order to further minimize the overall length, it makes sense to integrate braking systems and clutch actuators into an e-axle and to clear out the bulkhead of the vehicle with fewer actuating elements or no actuating elements in the case of fully autonomous driving

OBJECT OF THE INVENTION

The object of the present invention is to provide a vehicle axle for electric vehicles with an integrated actuator for braking and vehicle dynamics tasks which fulfills the requirements of high availability in fully automated driving (FAD) and autonomous driving (AD) and also creates the basis for the integration of additional hydraulic actuators, in particular for the steering, transmission actuators and torque vectoring modules.

Achieving the Object

The object of the invention is achieved by a vehicle axle having the features of claim 1. Advantageous designs of the vehicle axle according to claim 1 result from the features of the dependent claims.

The invention is advantageously characterized in that redundancy requirements of fully automated driving (FAD) and autonomous driving (AD) are met and, at the same time, high synergy effects are used in the interaction of the braking system with electric drive motors of electric vehicles. For example, the energy recovery of kinetic energy by the electric motor is not limited by the braking system as for example in the case of slave brake boosters without path simulator according to DE 11 2009 005 541 B3, while at the same time the electric motor can contribute to braking. The vehicle axle according to the invention is advantageously equipped for FAD with an actuating unit (BE) with a pedal feel simulator. However, it is also possible to implement the braking system according to the invention for AD without an actuating unit (BE), the braking system then being controlled by a superordinate control.

In the embodiment for level 4 (FAD), an actuating unit with corresponding redundancies must be provided for autonomous driving. The actuating unit (BE) optionally has a hydraulic connection to at least one brake circuit or is used as a pure pedal feel simulator without a connection to the hydraulics of the braking system, the actuation force then being transmitted purely electrically. An electric brake pedal (e-brake pedal) can be designed hydraulically or electromechanically. The aim is to make the actuating unit extremely short so that the length advantages of e-axle concepts can be fully exploited.

In the embodiment for autonomous driving (AD), no actuating unit is provided, a central control and regulating unit (M-ECU) taking over the communication with the actuating units.

For the vehicle axle with wheel-specific redundant brake control, the invention provides in a basic embodiment that the vehicle axle has at least one pressure supply device (DV1-A1, DV2-A2) with a piston-cylinder unit, the piston of which is adjusted via a gear, in particular a spindle drive, by an electric-motor drive (M1) for pressure control in the wheel brakes (RB1-RB4, H-EMB)

the pressure supply unit is filled out redundantly in such a way that either one pressure supply device is redundantly equipped with two electronic control and regulating units and in particular piston-cylinder units with redundant piston seals or another pressure supply device on the same axle or on another axle takes over the pressure control;

one or a plurality of pressure supply devices, preferably in addition to the brakes, also control other hydraulic actuators, in particular clutch and gear actuators, transmission locks, torque vectoring modules or hydraulic steering actuators, or form the pressure supply for these or perform the pressure control;

This design provides at least double-redundancy, at least for the pressure supply and its control, and a plurality of hydraulic actuators can be controlled very precisely with only one or fewer, in particular two, pressure supply devices. A very inexpensive and also reliable solution for a plurality of hydraulic actuators (brake, gear actuator, steering) can thus be implemented. In addition, thanks to the very precise pressure control based on the basic patents DE102005055751B4 and DE102005018649 B4 for the PPC method, comparable with the quality of a purely electromechanical solution (e.g., electric power steering, electromechanical brake) can be achieved at significantly lower costs.

The vehicle axle is preferably constructed in such a way that all hydraulic components or actuators (brakes, steering, gear actuators, clutches, etc.) with slave electronics and hydraulic control units HCU with valves and pressure transducers are positioned on the vehicle axle or are sensibly integrated into the units and all modules are controlled via a superordinate control unit (M-ECU) that is not located on the vehicle axle. Actuating units such as, in particular, the brake pedal on the bulkhead facing the vehicle interior are also possible. The actuating units are not required for vehicles of level AD.

The control signals to the various components or actuators of the vehicle axle can preferably be transmitted redundantly and a fast BUS system such as Flexray® is preferably used for fast data transmission without delay. Diagnostic processes as well as motor and pressure control are part of the slave ECU modules of the various components.

In an additional development of the basic embodiment according to the invention for providing an additional redundancy, it is provided that at least one, in particular each, electronic control and regulating unit controls separate windings of the or an electric-motor drive. This advantageously ensures that if a winding system fails, the drive motor can still be operated with at least half the maximum torque.

The embodiments described above can also be made more reliable if either one, in particular redundant, valve assembly is assigned to each pressure supply device, or one redundant valve assembly is assigned to two pressure supply devices. The invention understands a redundant valve assembly to be designed in such a way that if one or both control and regulating units of the pressure supply device fail, the solenoid valves of the pressure supply or the assemblies of the vehicle axle can still be operated safely.

If an actuating device is provided, in particular in the form of a brake pedal, it is advantageous if this acts on a piston-cylinder unit and adjusts its piston so that, in the event of a fault, a brake pressure can be built up with the actuating device in at least one brake circuit via a hydraulic connection. A simple master brake cylinder or a tandem master cylinder and an absolutely necessary pedal feel simulator can be provided here.

The braking systems described above advantageously regulate in control operation with a closed brake circuit, i.e., in control operation there is no pressure reduction via solenoid valves in the reservoir, and/or the pressure in the wheel brakes of the respective brake circuit is controlled or set using the PPC and/or multiplex method. To be on the safe side, the switching valves should be connected to the wheel brakes in such a way that they open automatically when the wheel brake is pressurized. This advantageously ensures that the brake pressure in the wheel brakes can be reduced in any case and undesired braking or locking of the wheels does not occur.

In an additional very advantageous design of the braking systems described above, at least one wheel brake, preferably two wheel brakes, is/are a hydraulically supported electromechanical brake (H-EMB), an electric parking brake (EPB) or an electromechanical brake (EMB). Similarly, in addition to a conventional hydraulic wheel brake, an electric motor of an additional electric parking brake or an electromechanical brake can have a braking effect on the wheel. This measure creates an additional redundancy. When a hydraulically supported electromechanical brake is provided, a braking force can advantageously be built up with this both hydraulically and electromechanically.

All modules are preferably controlled by a superordinate control unit (M-ECU) that is not located on the vehicle axle. Sends the control signals to the various actuators. It can thus control the pressure supply devices, valves, electric drive motors and/or EMB or H-EMB during the braking process and/or ABS control operation and/or to diagnose the braking system and, in addition to the brake, can also control other vehicle dynamics functions, e.g., steering, damping, roll stabilization, in a useful manner.

If at least one electric drive or traction motor is provided for at least one axle or wheel of the vehicle, this can also be used advantageously for braking an axle or a wheel. This provides an additional redundancy. In control operation or if a component of the braking system, for example a pressure supply device, fails, a (supporting) braking force can also be produced by means of the traction motor(s). Through a combined use of pressure supply device(s), hydraulically supported electromechanical brake(s) H-EMB, electric parking brake(s) EPB and/or electromechanical brake(s) EMB and/or one or a plurality of drive motors(s), a faster increase in braking force with a shorter time-to-lock (TTL) or a higher braking torque can advantageously take place in control operation or in the event of failure of one or a plurality of components of the braking system.

In the braking systems described above, each pressure supply device can advantageously be preceded by at least one separating valve at the outlet of the pressure supply, with the respective pressure supply device being able to be disconnected from the respective brake circuit by closing the separating valve, in particular if it fails.

In order to make the vehicle axle according to the invention with its integrated braking system even more secure against failure, at least one control and regulating device of a pressure supply and valve assembly can have a separate voltage supply and, in particular, signal transmission, in particular all modules of a pressure supply device can be supplied by at least two vehicle electrical systems and/or have redundant signal transmissions. Two vehicle electrical systems means that either different voltage levels and/or voltage sources are used to supply the components.

It is also advantageous if, in the aforementioned possible embodiments of the braking system according to the invention, either the pressure control in a brake circuit is carried out using at least one pressure sensor and/or via the current measurement of the motor current of the drive and path control of the piston of the pressure supply device, which can be further refined in the pressure control quality by taking into account the temperature of the drive. This enables precise pressure control even without a pressure sensor, as has already been explained in detail in the patents on the PPC method (DE102005018649 B4 and DE102005055751B4 in function without a temperature sensor.

In order to enable safe separation of the brake circuits in the event of a fault, e.g., a valve leak, and to reduce pressure in the wheel brakes, it is advantageous if a connection module with switching valves is arranged between the axles, so that either the brake circuits of the front and rear axles connectable to one another, separable from one another and/or one or both brake circuits can be connected to the reservoir, in particular if no actuating device is provided via which a pressure reduction in the reservoir can take place. The solenoid valves that are open in the de-energized state are advantageously used to connect the brake circuits to the reservoir. For the connection between the pressure units, de-energized closed solenoid valves or hydraulic fluid transfer pistons that can be locked in position should preferably be used in the connection module.

The connection module can either have a plurality of solenoid valves, for example, via which a hydraulic connection can be established between a brake circuit and the reservoir or between the two brake circuits. However, it is also possible that the connection module is formed by a piston-cylinder unit, the piston of which separates a first and a second pressure chamber from one another, the first pressure chamber being connected to a first brake circuit and the second pressure chamber to the other second brake circuit and the piston can be locked by means of a blocking device. In the locked state, there would be virtually no hydraulic connection between the brake circuits, since a volume shift is prevented.

It is also advantageous if the piston-cylinder units of the vehicle axle have redundant seals and hydraulic diagnostic lines and redundant control and regulating units are also provided, and that the drives of the pressure supply devices have 2×3 phases, and that by means of sensors of the motor current $i_{phase}$, the motor angle α, in particular the temperature T, is measured and taken into account in the pressure control, and that there is in particular a redundant supply via two vehicle electrical systems or voltage levels, and in that redundant signal transmission is provided. The provision of all these measures advantageously results in a very safe system which is suitable for AD levels 3-5.

A reservoir can advantageously be used in the vehicle axles described above which has a plurality of separate chambers, one chamber of the reservoir being hydraulically connected or connectable to at least one pressure supply device and/or an additional chamber being hydraulically connected or connectable to the connecting module. This advantageously results in additional circuit options by means of the valves used, which contribute to the additional safety of the vehicle axle.

The above-described braking systems of the vehicle axles can advantageously be operated in such a way that the deceleration of the wheels is carried out by means of the pressure supply device(s), the electric drive motor(s) and the hydraulically supported electromechanical brake (H-EMB) at least for each axle, preferably for each wheel or the electromechanical brake (EMB). Torque vectoring can also be carried out by means of the pressure supply device(s), the electric drive motor(s) (TM) and the hydraulically supported electromechanical brake (H-EMB) or the electromechanical brake (EMB).

When using a temperature sensor, the temperature of the drive of the pressure supply device(s) can also be determined and the temperature can be used to more precisely determine the torque moment constant, which decreases linearly by the factor (1−Br %*ΔT) as a result of the temperature increase of the rotor of the electric motor. This allows an even more precise control of the torque and thus of the pressure, as long as this is based on the relationship torque=kt(T)*phase current i.

For pressure control, in addition to the current control, the piston position and the pressure volume characteristic can also be used and the change in the pressure volume characteristic in the case of, e.g., air inclusion, can be adjusted by the pressure sensor or the H-EMB. The combined use of the two methods described above results in a high-precision pressure control that is also possible without a pressure sensor. This method provides additional redundancy in the event of failure of pressure transducers or can also be used to simplify the system with low redundancy requirements (e.g., system with only one or without pressure transducers).

The braking system of the vehicle axle according to the invention can also be used for steering/torque vectoring and for actuating transmissions, in particular clutches, wherein the wheel-specific control options with the at least one pressure supply and the hydraulically supported electromechanical brake(s) H-EMB, electrical parking brake(s) EPB and/or electromechanical brake(s) EMB and/or drive motors or the steering EPS can be used.

The invention is thus characterized by a very simple structure with very high availability, i.e., in the event of a complete or partial failure of modules, the function is not restricted or is restricted to a very small extent. Even if various components fail, almost maximum deceleration and driving stability can always be ensured. For this purpose, a deceleration of 0.6 to 0.9 g and an axle-based control or wheel-specific control with steering intervention/stability intervention is guaranteed even if a pressure supply device fails. A high level of availability and performance is thus achieved—once again collectively—through the following measures, which can be provided individually or in combination:

Mainly operation in the closed brake circuit (>90% of the operating time) both in the brake booster (e-BKV), recuperation operation and mainly in ABS control operation, thus avoiding dormant faults. If the system is operated in an open manner, for example in the ABS it is hydraulically connected to the reservoir by opening a valve, which makes undetected leaks in valves and seals (dormant faults) particularly difficult to detect. Therefore, the operating state should be avoided or a diagnosis of the tightness after every ABS operation is useful; a diagnosis can take place in such a way that, for example, when the valve is closed, the piston of the pressure supply is moved and a volume loss or pressure increase is determined and evaluated.

Figure 7:
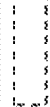

Redundancies and partial redundancies of the DV motor electronics: e.g., design of the motor of the DV as a 2×3 phase motor as well as partial redundancy of the motor control. This means that if one of the electronic components fails (winding short circuit, failure of a 3-phase line, the motor can still be operated with half the torque. With a design for 200 bar, 100 bar, i.e., approximately the blocking pressure, can then also be achieved in the event of failure. This means that even if one of the electronics fails, ABS operation with maximum performance with low coefficients of friction and satisfactory performance in road conditions with a high coefficient of friction is possible;

Partial redundancies of the electronics for the valve control. If the electronics fail, it is very advantageous for availability if the switching valves can still be operated. Thus, redundancy for the valve control is to be provided in the electronics so that the valve actuation still functions if the engine control fails;

Use of an H-EMB, EMB or EPB in braking operation, in particular use of EPB or H-EMB in the event of module failure. This means that, on the one hand, the wheel can be braked via the hydraulic access and via the electric motor built into the H-EMB. The electric motor can be designed as an EC motor or a brush motor. Thus, braking support can be provided by the electric motor on the respective wheel;

Use of the used traction motors to increase the braking torque with simultaneous recuperation of kinetic vehicle energy. Due to the high inertia of the drive motor, however, it must be taken into account that a braking torque can be built up less dynamically via the traction motor than via the pressure supply and the H-EMB, EPB or EMB;

Use of a fail-safe and diagnosable actuating unit with pedal feel simulator, redundant displacement sensors and a force-displacement sensor (KWS) as well as a special circuit for diagnosing the pedal feel simulator;

Use of valves with a self-opening mechanism when there is pressure in the wheel brake in such a way that the pressure in the wheel brake opens the solenoid valve;

Use of a diagnosable connection module (VM) with which the brake circuits can be safely connected or disconnected and the wheel brakes can be connected to the reservoir, in particular if the system does not have an actuating device (BE) with a connection to the reservoir;

Use of a hydraulic fall-back level in a brake circuit or an axle via connection of the actuating unit via a switching valve FV;

Subsequent delivery of volume of the DV when the volume limit is reached;

Operation of the pressure position without pressure transducer through intelligent, precise torque estimation from the motor phase current, taking into account the motor temperature and the pressure volume characteristic, which is compared via a pressure transducer or the H-EMB function;

Use of trapezoidal spindle (no blocking of the spindle by dirt particles in the raceway);

In Table 1 according to FIG. 7, the following are listed for the vehicle axle according to the invention or various vehicle dynamics control functions, such as electric brake boosting e-BKV, ABS operation, steering/torque vectoring, stability control/ESP, energy recovery by electric motor and parking brake EPB, transmission lock GS, which can be represented by the components pressure supply on axle 1 (DV1-A1 and DV2-A1) or pressure supply on axle 2 (DV-A2), TM1 and TM2 drive motors, electrohydraulic steering EPS and hydraulically supported H-EMB or parking brake EPB. Thus, the primary function and the secondary function/redundancy are identified. This makes it clear that the most important vehicle dynamics functions of an axle are available in at least a double redundant manner. When designed as a 2×3 phase motor and connection module between the front and rear axles, the pressure control can even be viewed as triple redundant.

The PPC method, see above for DE102005055751B4 and DE102005018649B4, can be refined by temperature measurement and used for brakes, steering and clutches, in particular if the pressure transducer fails and forms an additional redundancy in operation.

The e-axle system according to the invention with an integrated braking system is therefore suitable for all levels of autonomous driving up to level 5 (AD).

A pressure supply device according to the invention can also be driven by a rotary pump, which can in particular be a gear pump. It can then have a motor housing with an electric-motor drive arranged therein, which drives the gear pump. The drive has a stator and a rotor for this purpose. An internal gear of the gear pump is moved via the rotor of the drive. According to the invention, the drive is designed as a dry runner by means of at least one seal, which is arranged between the rotor and the inner gear wheel, or has a dry running rotor, i.e., the medium conveyed by the gear pump does not flow around the rotor of the drive and/or is not surrounded by the medium. Due to the design as a dry runner, the rotor rotates without major friction and flow resistance, which means that higher speeds and better efficiency can be achieved.

A particularly compact and simple pressure supply device is obtained when the motor housing has a side wall on which the gear pump is arranged, in particular this has a recess in which the gear pump is at least partially or entirely inserted. The side wall of the motor housing can be penetrated by a shaft connected to the rotor in a rotationally fixed manner, the gear wheel either being connected to the shaft in a rotationally fixed manner or being coupled to the shaft via an interposed gear and/or a clutch.

An advantageous compact and integrated design of the pressure supply device described above is obtained if the drive with its housing rests against a hydraulic housing with at least one valve and/or hydraulic lines or channels arranged therein or forms a unit therewith. The side wall of the drive housing can abut or adjoin the side wall of the hydraulic housing, in particular be attached thereto, the particularly pot-shaped recess receiving the gear pump at least partially or completely and being open towards the hydraulic housing. With housings arranged next to one another, the gear pump can either rest entirely in the recess in the wall of the drive housing, entirely in a recess in the hydraulic housing or both in a recess in the side wall of the drive housing and in a recess in the side wall of the hydraulic housing. In the latter case, the openings of the two recesses then face one another. Additional seals can be provided in order to seal the two housings to one another and to the outside.

The above-described recess in the side wall of the drive housing is advantageously open to the outside and, if a hydraulic housing is present, opens thereto. The recess itself can advantageously be designed in the shape of a pot. It can also have a cylindrical section which is circular in cross-section and in which the gear pump rests with its gears.

The side wall of the drive housing can also advantageously be designed as a flange with which the drive can be fastened to another part or unit.

The gear pump used in the pressure supply device according to the invention can be an internal gear pump with a sickle, an external gear pump or a toothed ring pump.

The gear pump can also advantageously be arranged axially next to the stator and/or the rotor of the drive, the structure and size thereof is not disadvantageously limited by the gear pump. The size and structure of the gear pump is then not dependent on the dimensions of the stator and the rotor.

The drive housing can be designed in at least two parts, the side wall being part of or forming a first housing part. The second housing part can, for example, be pot-shaped and accommodate the stator and the rotor of the drive.

As already stated, the rotor is connected to the gear by means of a drive shaft directly or via a transmission and/or a clutch. The gear can be connected to the drive shaft in a rotationally fixed manner either by means of a force-fit connection or by means of a form-fit connection, which is formed in particular by means of a pin or serration. In the gear ring pump, the inner gear is arranged eccentrically on a part connected to the drive shaft, in particular in the form of a disk or a cam disk.

Both when the gear pump of the pressure supply device according to the invention is designed as an internal gear pump or as a toothed ring pump, an external inner ring gear is also necessary in addition to the internal gear. In the case of the internal gear pump, the inner ring gear is rotated about its axis of rotation by means of the internal gear wheel driven by the drive shaft, the inner gear wheel being arranged eccentrically to the inner ring gear. The inner ring gear rotates in an outer ring or cylinder surrounding it. In addition, a sickle must be provided which must be arranged in the space between the inner ring gear and the inner gear wheel resulting from the eccentricity.

In contrast to the internal gear pump, the inner ring gear is fixedly arranged in the gear ring pump, the inner gear rolling, due to its eccentric mounting on the disc, being rotated by the drive shaft in the inner ring gear. A sickle as with the internal gear pump is not required.

According to the invention, the drive shaft can either be supported or mounted
  a) in the motor housing, on the one hand, and in the gear pump and/or in the hydraulic housing on the other hand, or
  b) only in the gear pump or
  c) in the hydraulic housing and in the motor housing or
  d) in the gear pump and in the hydraulic housing
by means of suitable bearings, in particular radial bearings, in the form of ball or roller bearings and/or axial bearings.

If a hydraulic housing is provided, the drive shaft can extend into the hydraulic housing, in particular up to its side opposite the drive. For example, a target for a sensor can be arranged on the drive shaft, the sensor being arranged in the control and regulating unit (ECU). Additional seals can prevent the delivered medium from entering the control and regulating unit. It is also possible that the drive shaft extends right through the hydraulic housing and ends in the housing adjoining it, for example an control and regulating unit.

The gear pump can be designed differently as an internal gear pump. Thus, in a first embodiment, the inner gear, the inner ring gear, the sickle and the outer ring can be arranged between two disks, with the disks being firmly connected to the outer ring after appropriate centering and adjustment of the parts to one another. The cohesive connection can extend all the way around the circumference, resulting in a stable and compact embodiment in which the individual moving parts have only small clearances and gaps with one another, whereby good efficiency is achieved and high pressure can be achieved.

Possible embodiments of the braking system according to the invention are explained in more detail below with reference to drawings.

Figure 1B:
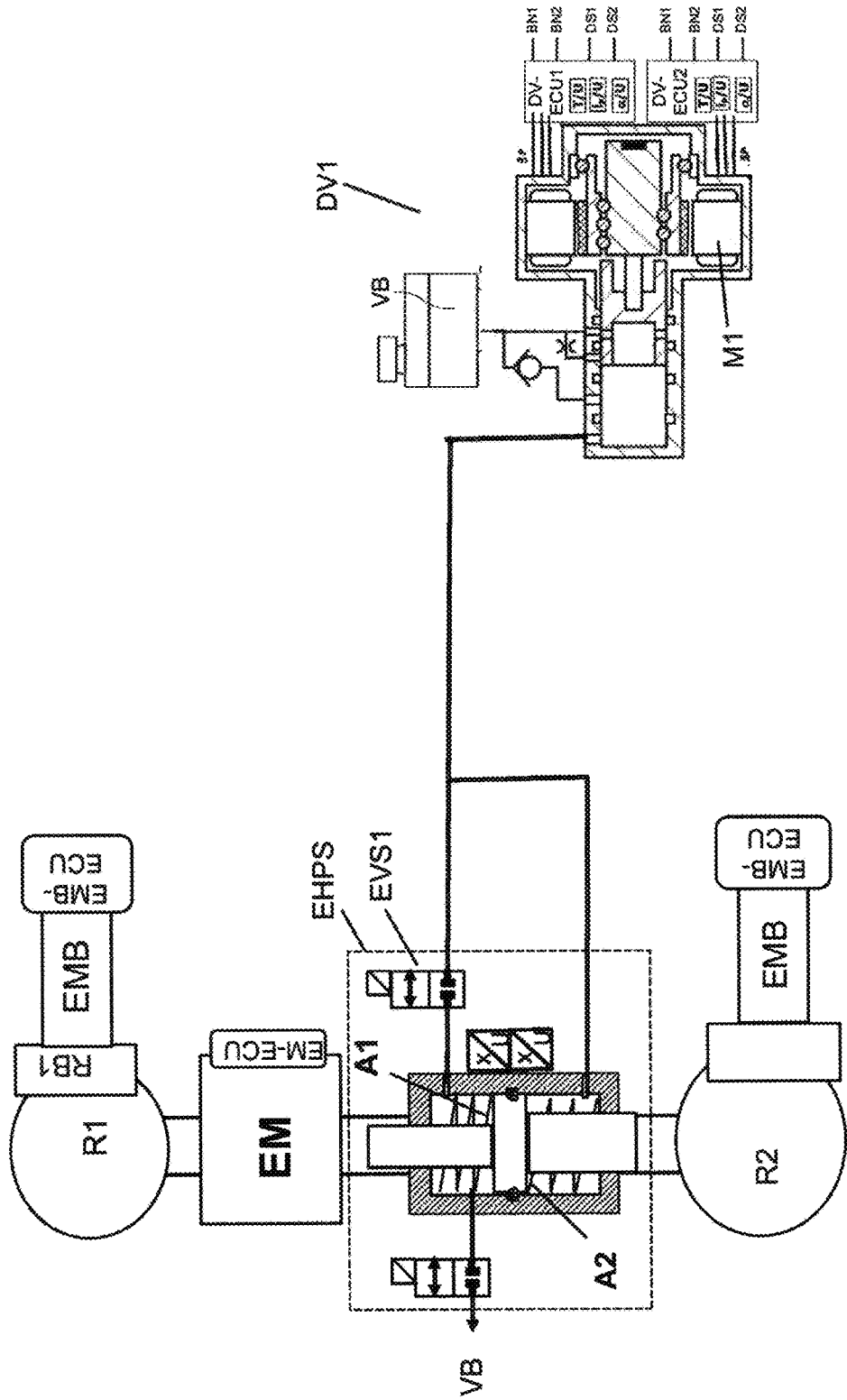
Figure 1C:
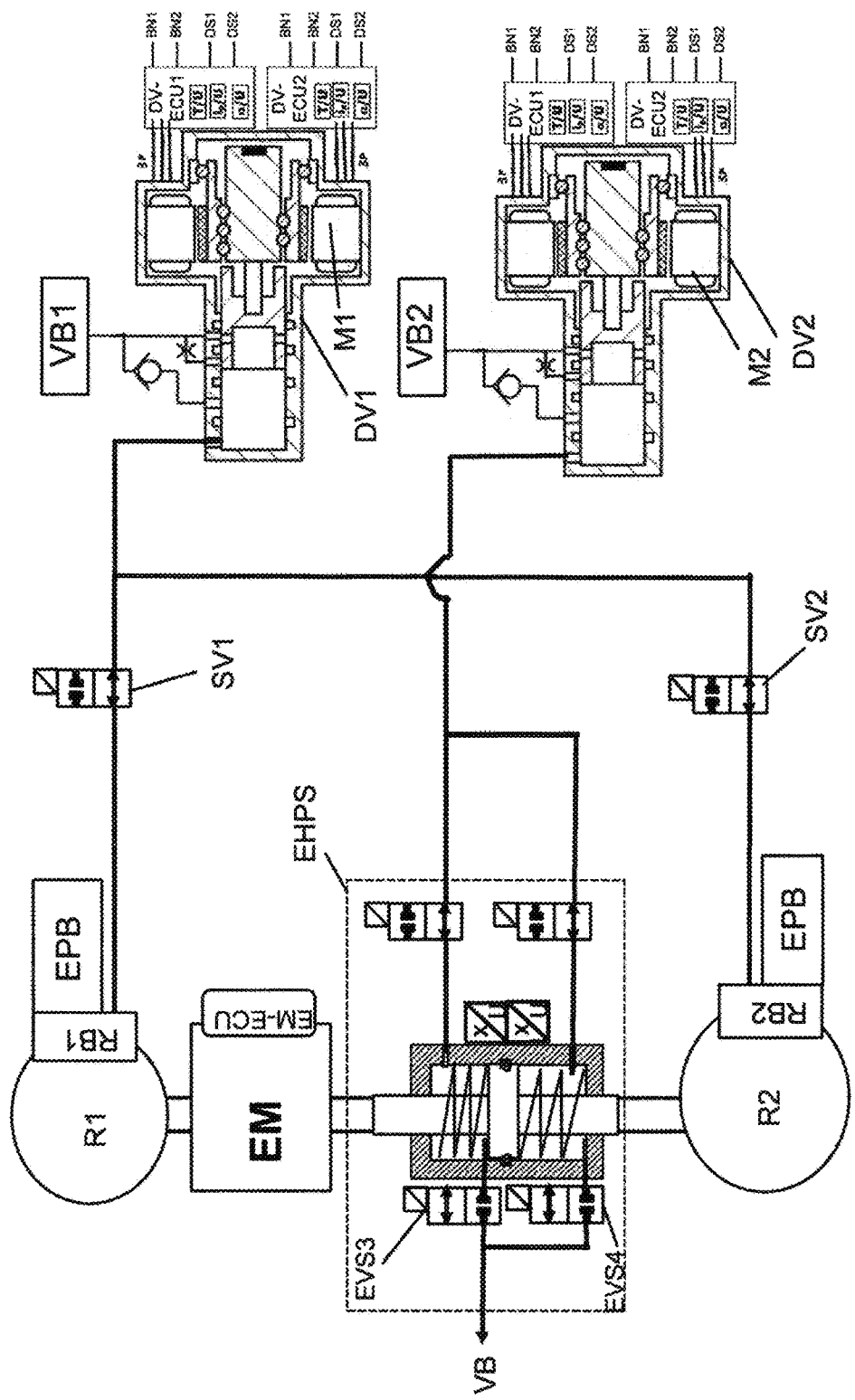
Figure 2A:
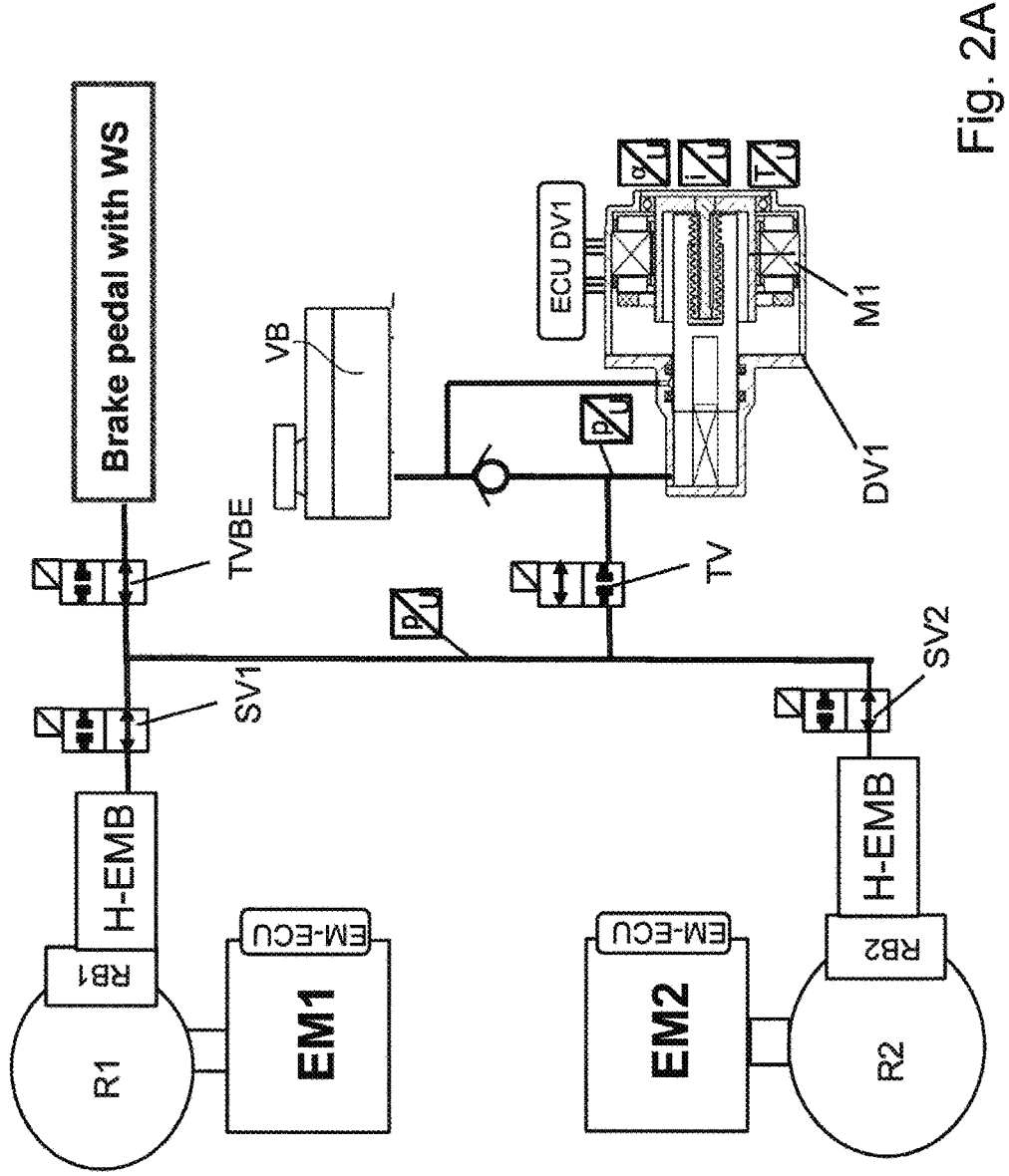
Figure 2B:
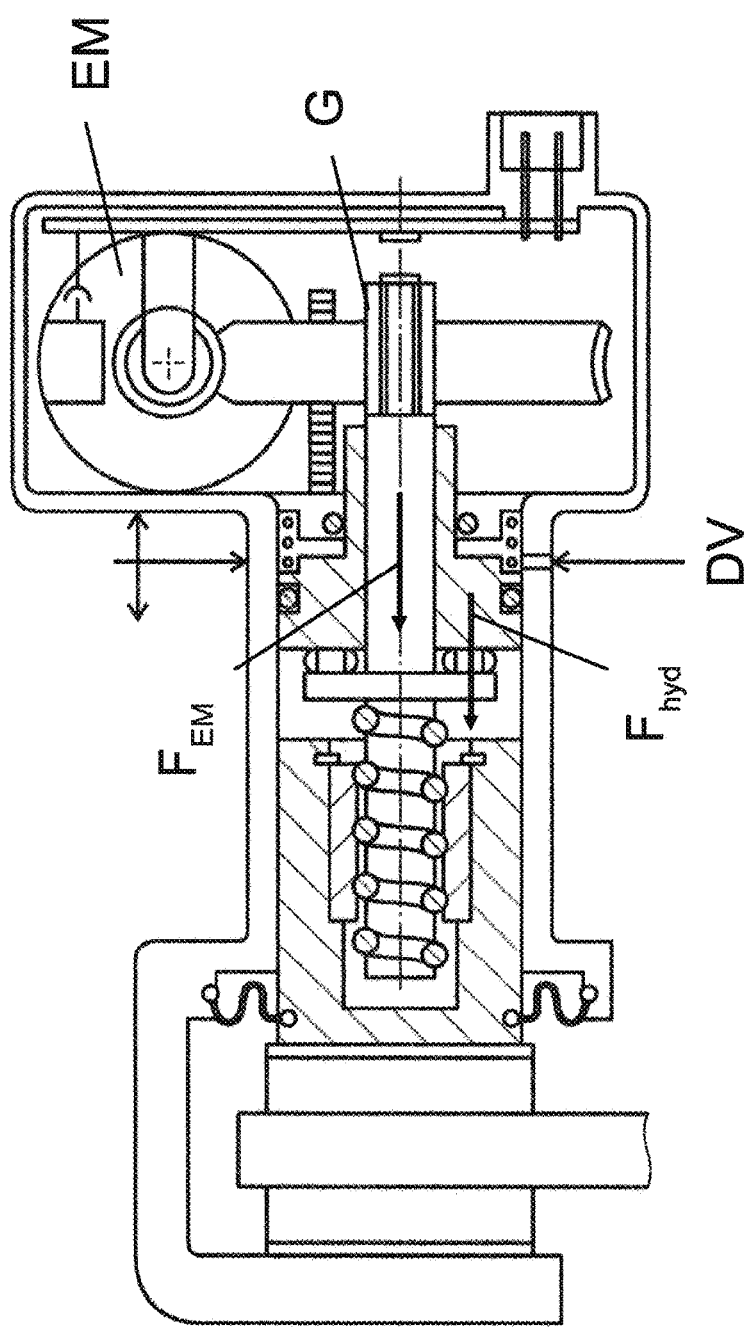
Figure 3A:
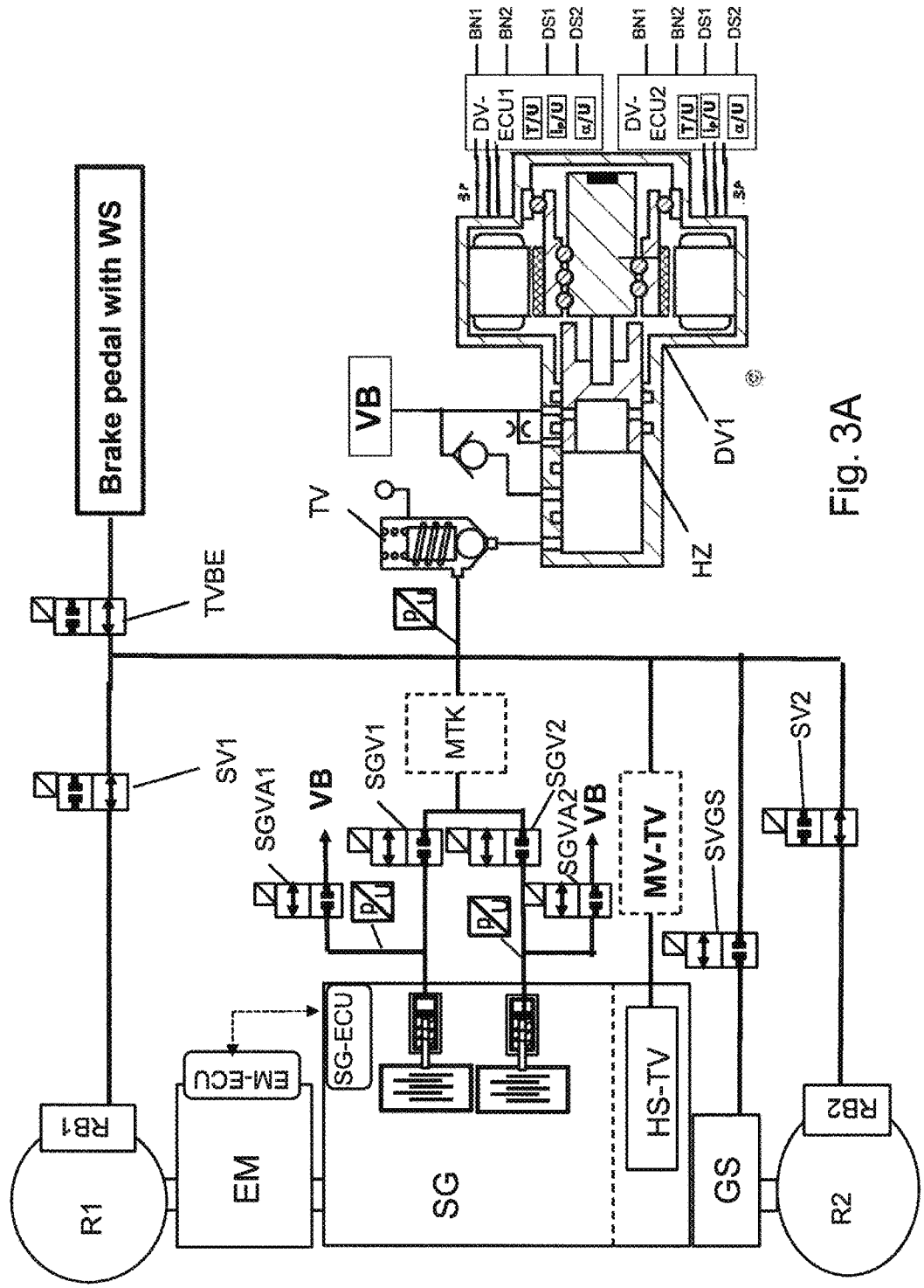
Figure 3B:
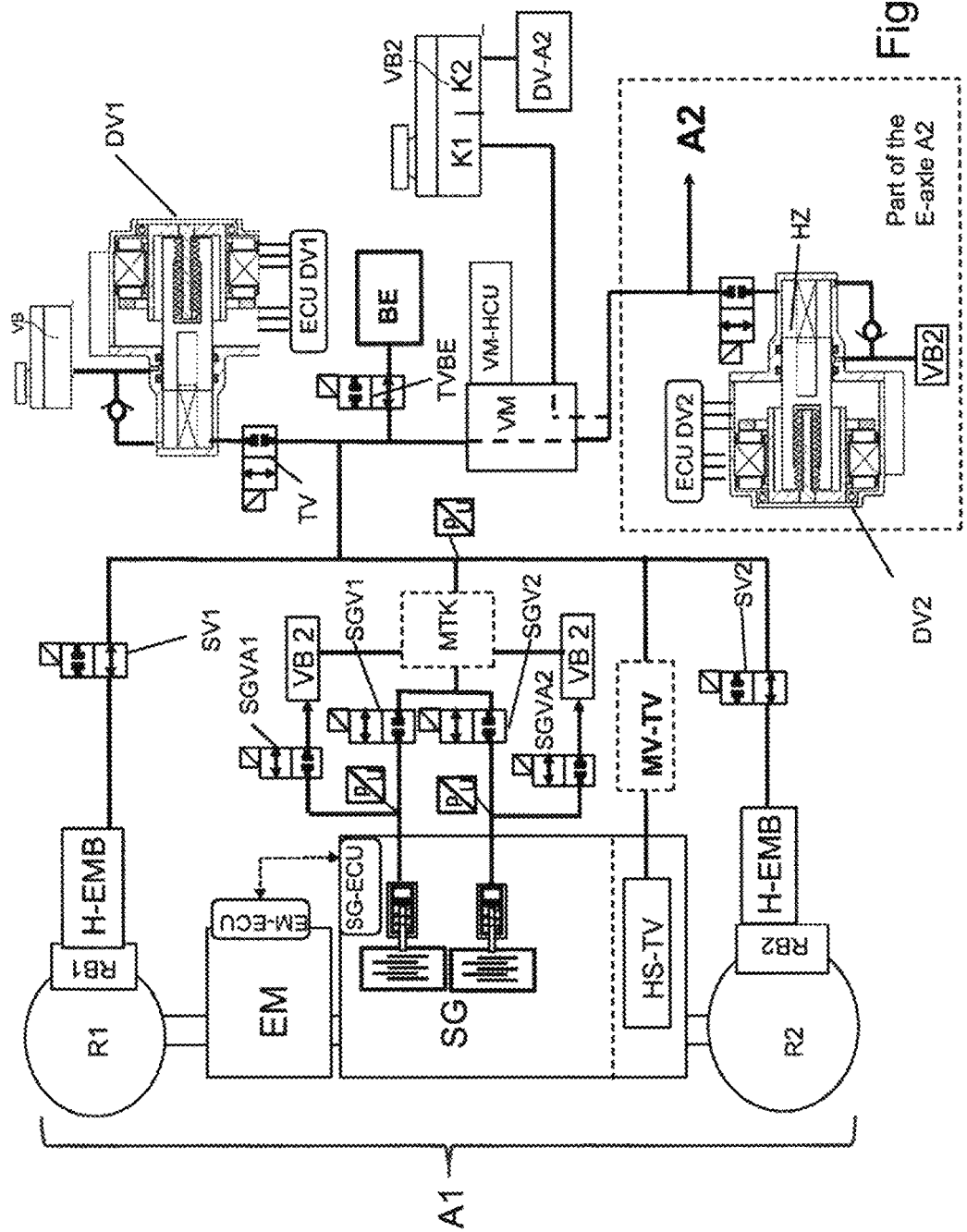
Figure 3C:
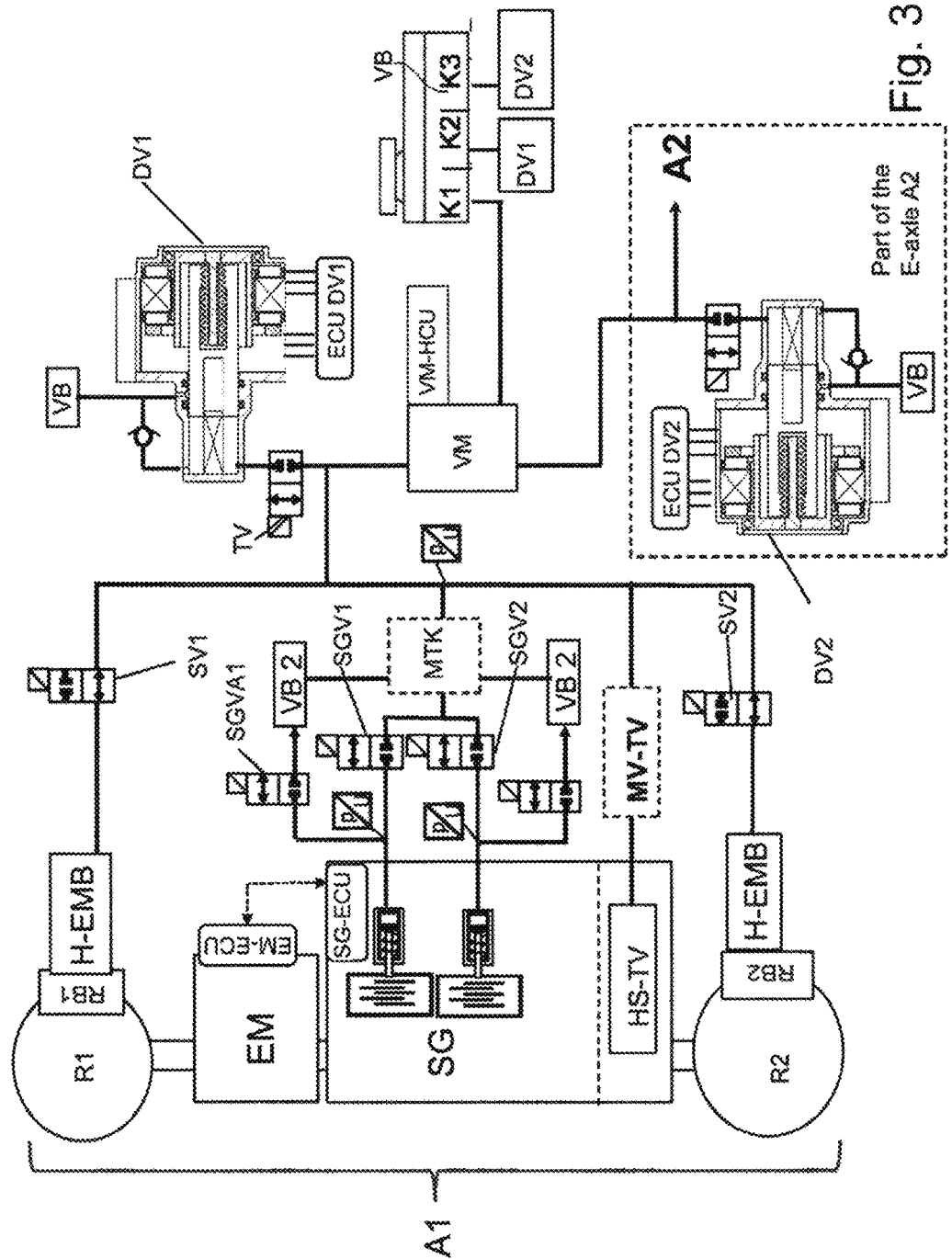
Figure 3D:
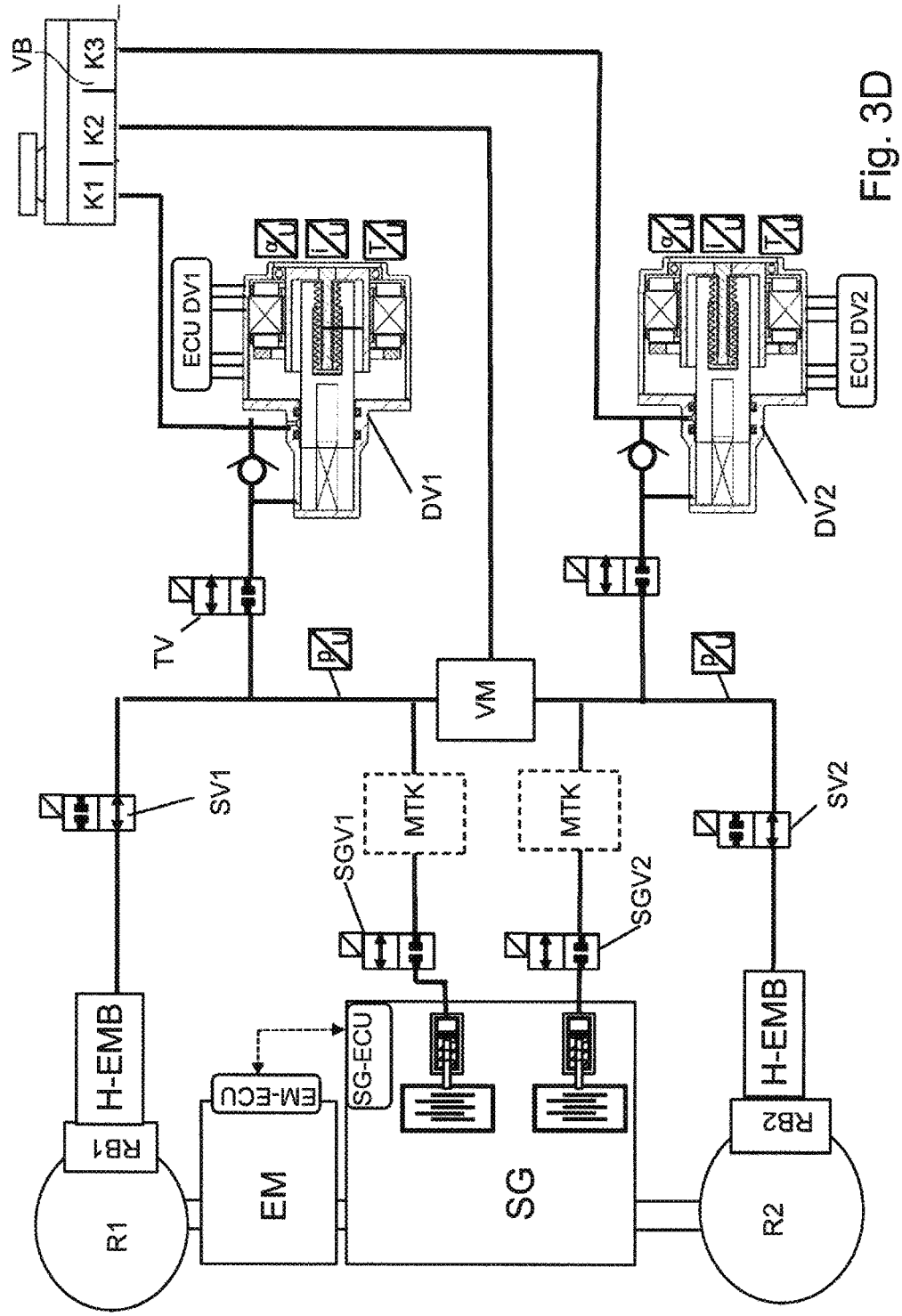
Figure 3E:
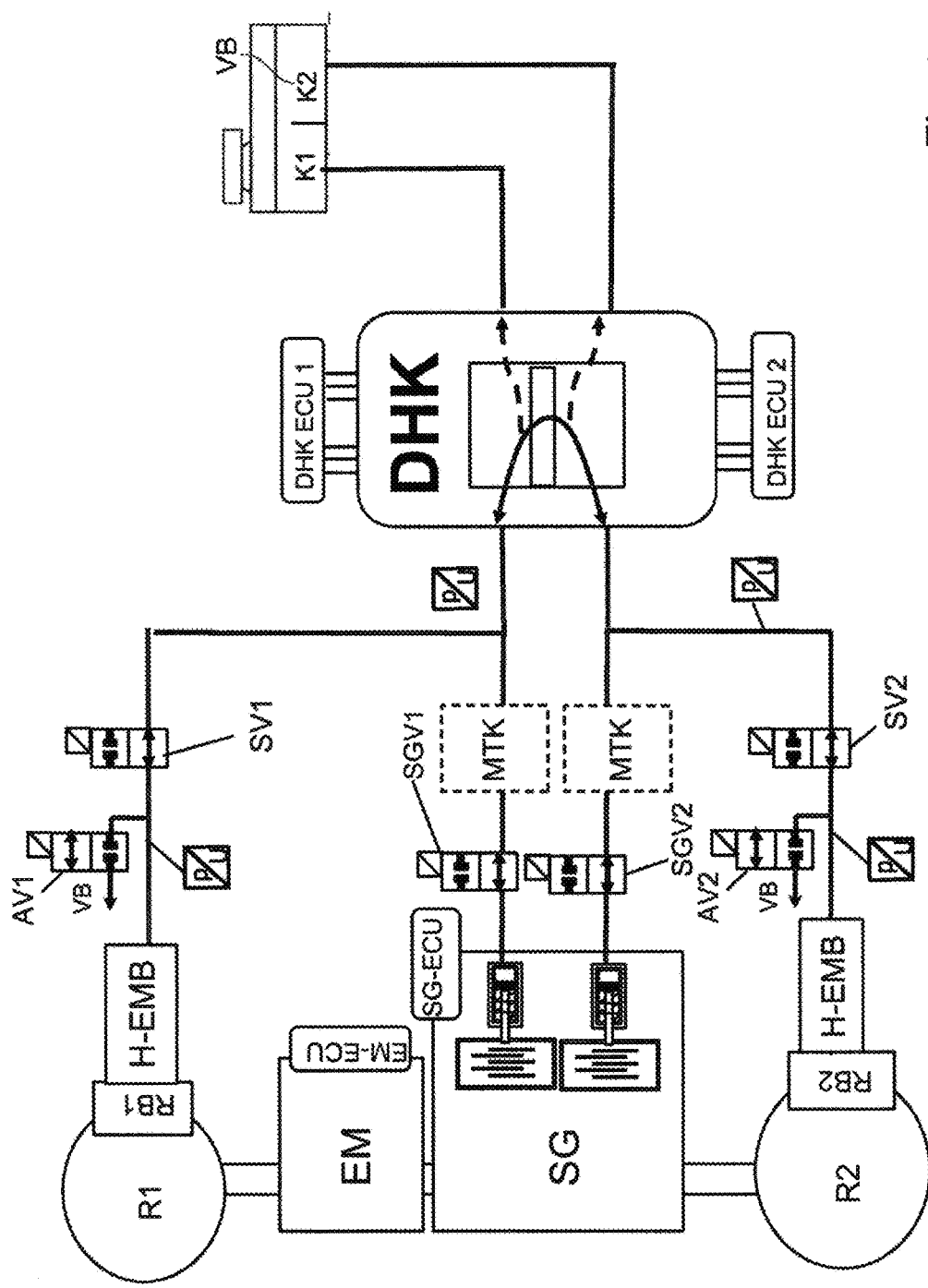
Figure 3F:
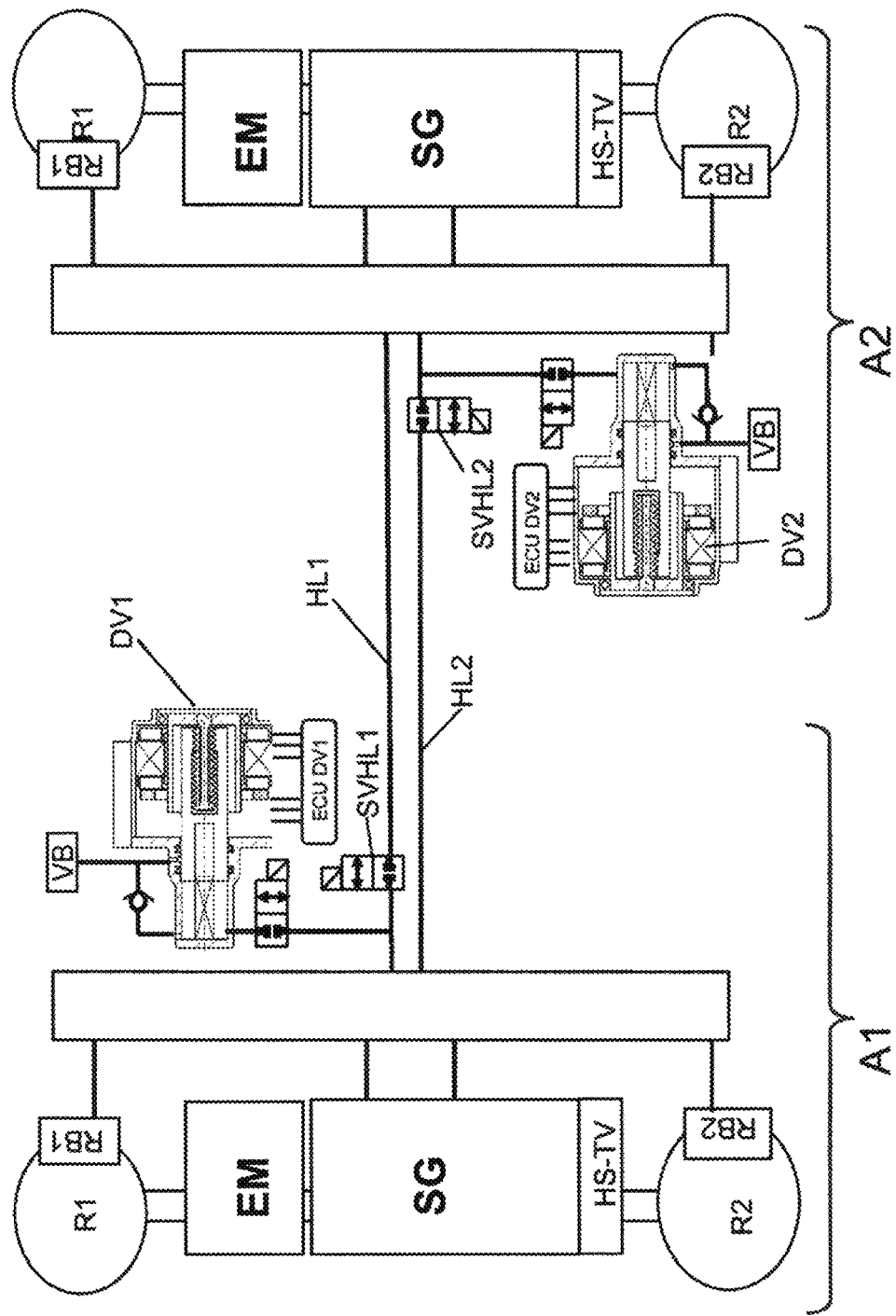
Figure 4:
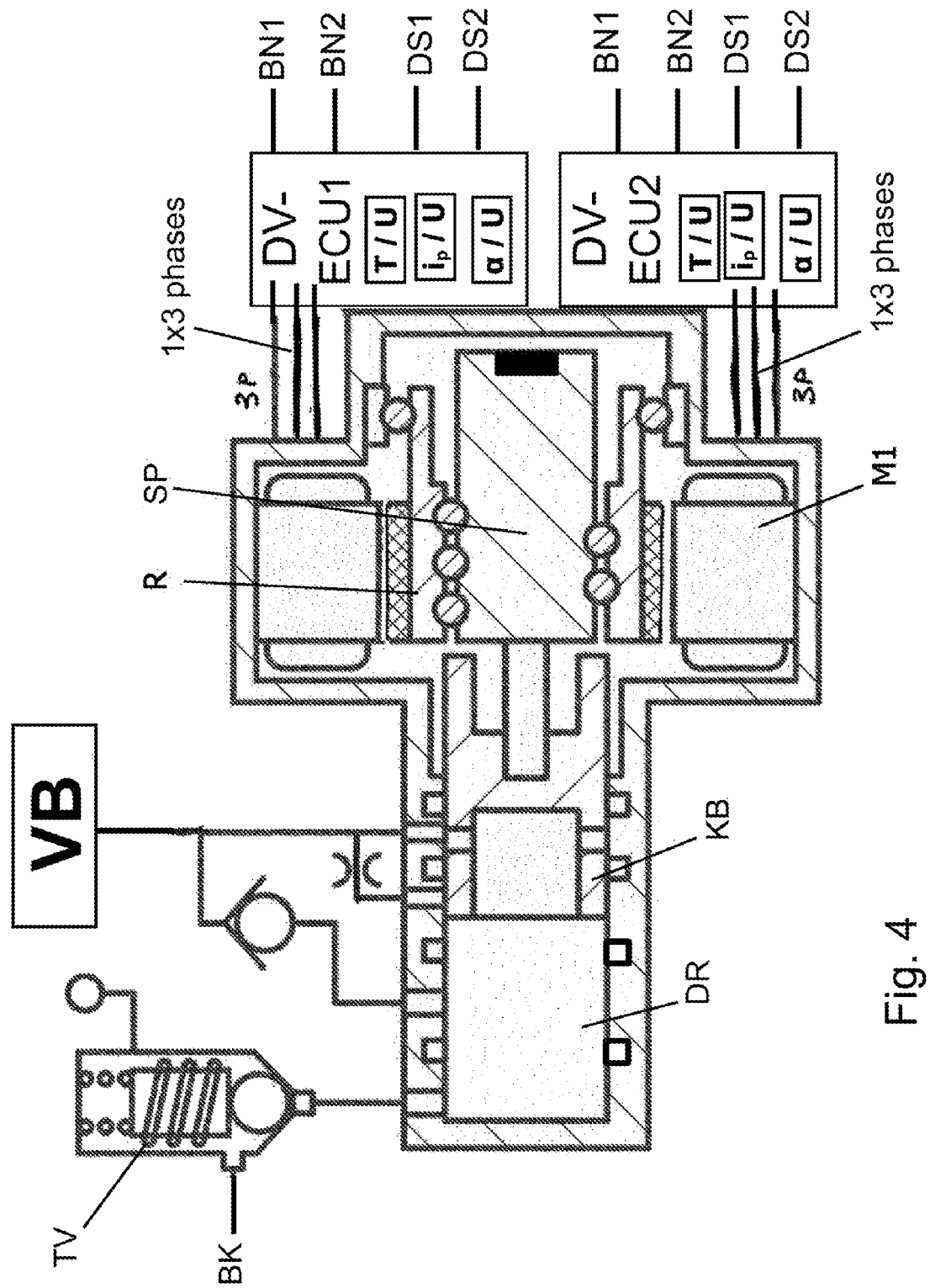

In the figures:

FIG. 1: shows a schematic representation of a first embodiment of the e-axle according to the invention with one or two redundant pressure supply device(s) DV1-A1 (DV2-A2), an electric motor EM for driving an axle, electrohydraulic power steering EHPS, electric parking brake and hydraulic control unit HCU as well as associated control electronics of the assembly;

FIG. 1A: shows a hydraulic principle circuit diagram of a first embodiment of the e-axle according to FIG. 1 with an electric parking brake EPB and variant 1 of an electrohydraulic steering system EHPS with a pressure supply device;

FIG. 1B: shows a hydraulic principle circuit diagram of a second possible embodiment of the e-axle according to FIG. 1 with an electromechanical brake EMB instead of an electric parking brake and redundant pressure supply device and variant 2 of an electrohydraulic steering EHPS with a separate redundant pressure supply device;

FIG. 1C: shows a hydraulic principle circuit diagram of a second possible embodiment of the e-axle according to FIG. 1 with electric parking brake EPB and redundant pressure supply device for brake actuation and separate redundant pressure supply device for steering actuation;

FIG. 2: shows a schematic representation of a second embodiment of the e-axle according to the invention with a pressure supply device, a hydraulic control unit HCU, one drive motor per wheel and a hydraulically supported electric brake H-EMB and associated control electronics for the assemblies;

FIG. 2A: shows the hydraulic principle circuit diagram of the second possible embodiment of the e-axle according to FIG. 2;

FIG. 2B: shows a cross-sectional representation through a hydraulically supported electromechanical brake H-EMB for use in the second possible embodiment FIG. 3: shows a schematic representation of a third embodiment of the e-axle according to the invention with one or two pressure supply devices, a hydraulic control unit HCU, an electric drive motor EM and manual transmission SG with torque vectoring module TV and transmission lock GS FIG. 3A: shows a hydraulic principle circuit diagram of a first variant of the e-axle according to FIG. 3 with a redundant pressure supply device;

FIG. 3B: shows a hydraulic principle circuit diagram of a second variant of the e-axle according to FIG. 3 with a pressure supply device and actuating unit BE with hydraulic connection on axle 1 and connection module VM to an additional pressure supply device on A2;

FIG. 3C: shows a hydraulic principle circuit diagram of a third variant of the e-axle according to FIG. 3 with a pressure supply device with hydraulic connection on axle 1 and connection module VM to an additional pressure supply device on A2 and a central reservoir FIG. 3D: shows the hydraulic principle circuit diagram of a fourth variant of the e-axle according to FIG. 3, each with a pressure supply unit for a wheel brake and a clutch of a dual clutch manual transmission;

FIG. 3E: shows a hydraulic principle circuit diagram of a fifth variant of the e-axle according to FIG. 3 with a double stroke piston with redundant electronics for the actuation of wheel brakes and dual clutches;

FIG. 3F: shows a hydraulic principle circuit diagram of a further variant for a vehicle with two vehicle axles shown;

FIG. 4: shows a pressure supply device with two control and regulating devices

Figure 5:
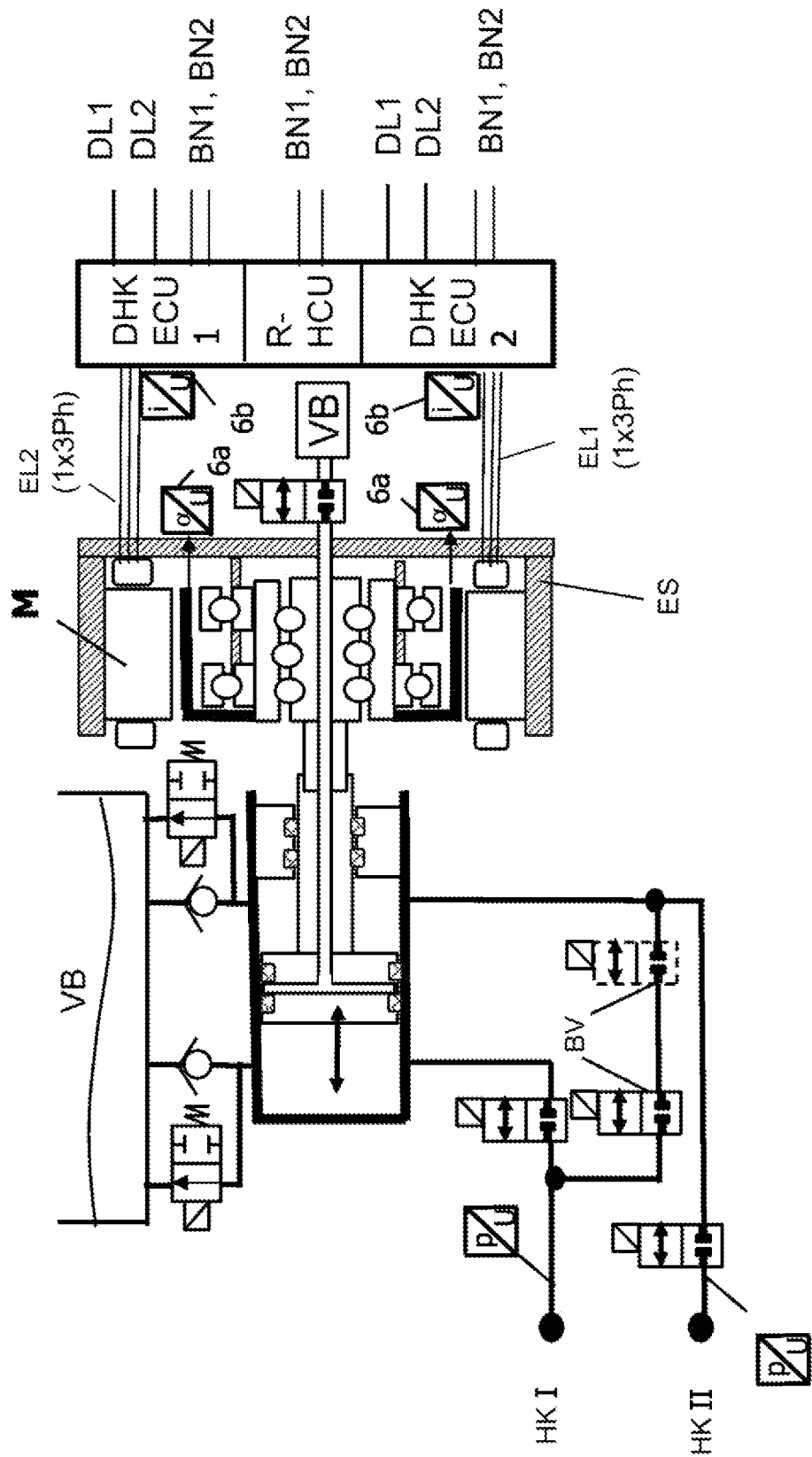
Figure 6:
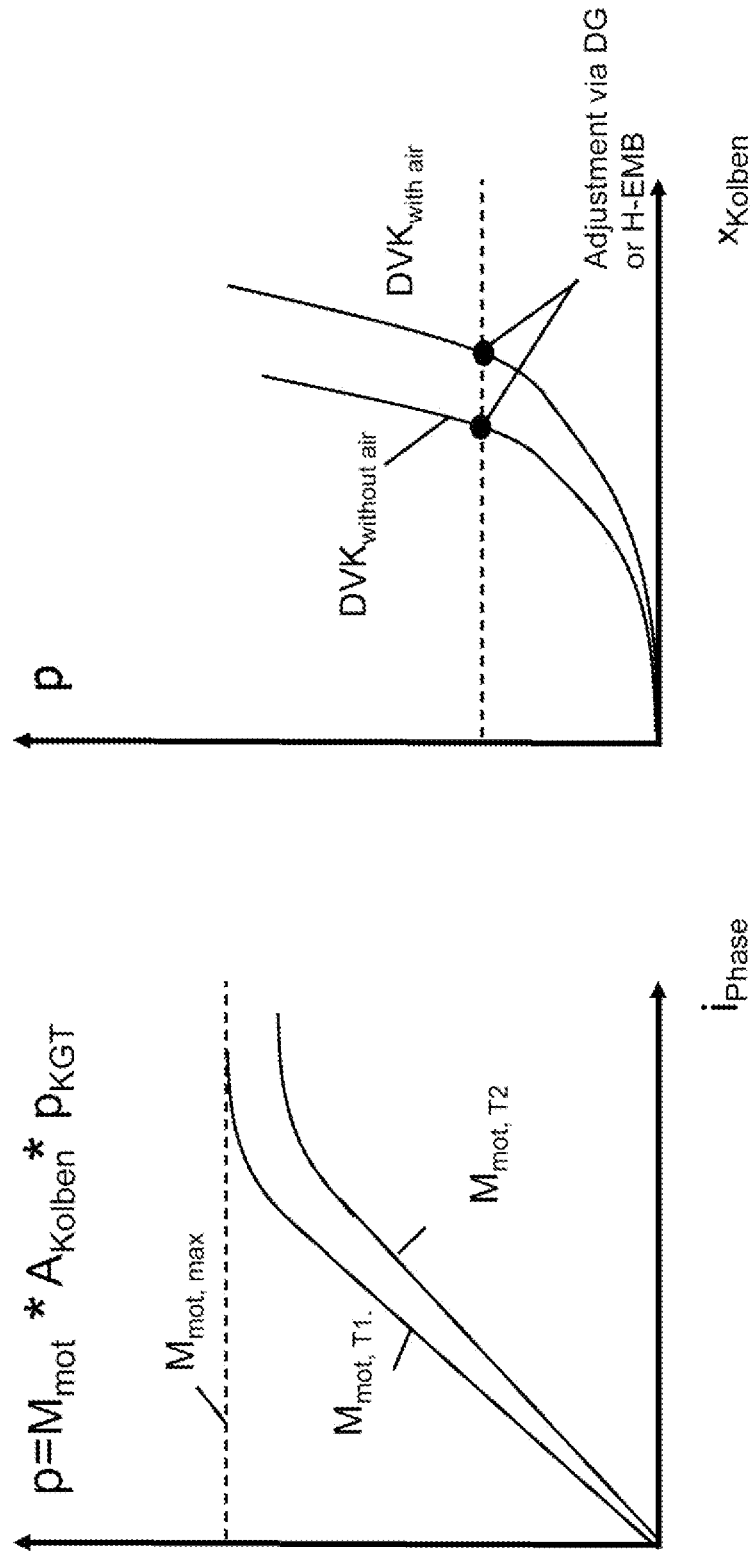
Figure 8B:
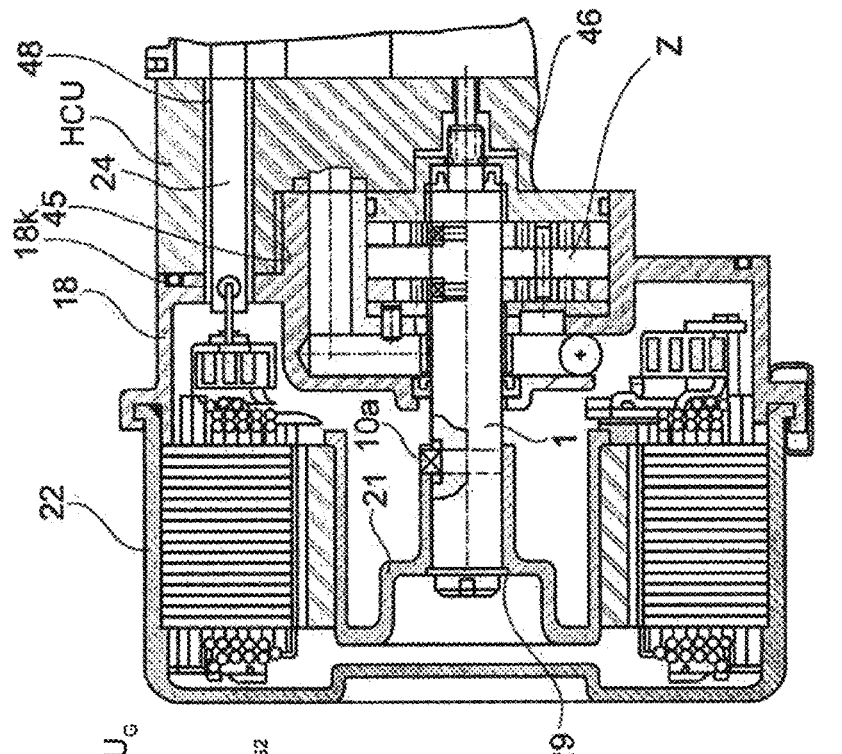
Figure 8A:
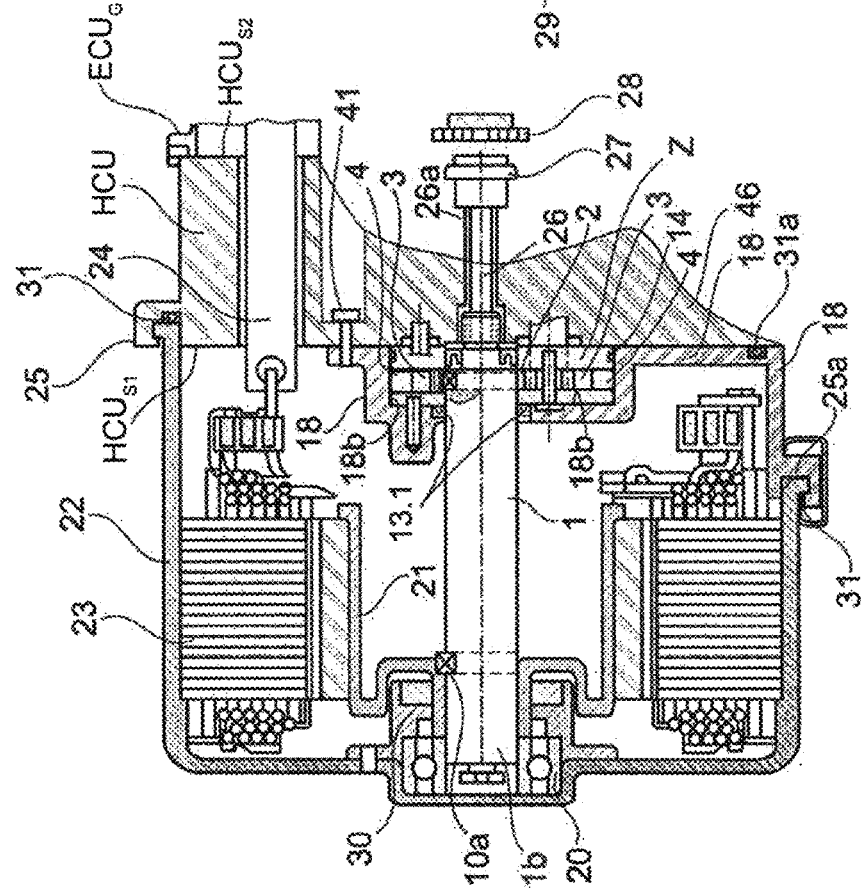

FIG. 5: shows a pressure supply device designed as a double piston with two control and regulating devices, valve switching and redundant seals with the possibility of diagnosing the failure of a seal FIG. 6: shows a brake pressure control in the event of failure of the pressure transducer by means of current and temperature measurement and evaluation of the pressure-volume characteristic curve;

FIG. 7: Table 1: shows an e-axle primary function and secondary function/redundancy;

FIG. 8A: shows a unit consisting of electric motor 22, single-circuit rotary pump Z, HCU with solenoid valves and ECU FIG. 8B: shows a unit consisting of electric motor 22, two-circuit rotary pump Z, HCU with solenoid valves and ECU FIG. 1 shows a first possible embodiment of the vehicle axle 100 according to the invention with the wheels R1 and R2, each wheel being braked by means of a conventional wheel brake RB1, RB2 and additionally having a parking brake EPB. The vehicle axle 100 also has an electric motor EM with control EM-ECU to drive the axle, as well as an electrohydraulic power steering EHPS. In a first design variant, the vehicle axle also has a pressure supply device DV1 which, together with the valve assembly HCU, controls the pressure in the wheel brakes RB1 and RB2 using the multiplex method and/or PPC method. The pressure supply device DV1 is controlled by an control and regulating unit ECU DV1, which controls the electric drive motor of the pressure supply device DV1 by means of two separate phase systems, in particular 2×3 phases. If one of the two phase or winding systems should fail, the drive motor can still be operated with reduced power, so that there is not a total failure of the pressure supply device DV1. If additional redundancy is to be created, this can be done by providing a second pressure supply device DV2, which is also controlled by an control and regulating device ECU DV2 and can also have two winding or phase systems to increase reliability. The pressure supply or control of the electrohydraulic power steering EHPS is also carried out by the pressure supply device, this being done separately from the pressure control in the wheel brakes by means of the valve assembly HCU. If supported steering is also required at the same time as the braking process, the wheel brakes RB1 and RB2 can be supplied together with the steering in multiplex operation. If two pressure supply devices DV1 and DV2 are provided, the steering system also has two redundant pressure supply devices.

The dashed line marked 100 forms the system boundary of the vehicle axle according to the invention.

The valve assembly can be designed as shown in FIG. 1A, a switching valve SV1, SV2 being assigned to each wheel brake RB1, RB2. When the switching valve SV1, SV2 is open, the pressure in the respective wheel brake RB1, RB2 can be controlled by means of the pressure supply device V1, with the pressure in the respective wheel brake RB1, RB2 being included or frozen when the switching valve SV1, SV2 is closed. It is optionally possible to provide an outlet valve at least in one wheel brake, so that the pressure in this wheel brake can be reduced via the outlet valve. When the associated switching valve is closed, the pressure in the other wheel brake can then be built up at the same time by means of the pressure supply device.

Should the pressure supply device fail in whole or in part, a braking torque can be produced alternatively or additionally with the parking brakes EPB and/or by means of the electric drive EM.

If an actuating device BE, not shown, is provided, as shown schematically in FIG. 1a, which has a piston-cylinder unit whose piston can be adjusted by means of the brake pedal of the actuating device BE, brake pressure can be built up in the wheel brakes RB1, RB2 in an emergency. In this case, the pressure supply device must be preceded by a separating valve TV1, which is closed without current, whereby the pressure supply device DV1 is separated from the wheel brakes RB1, RB2 and the actuating device BE.

The pressure control in the wheel brakes takes place via the pressure transducer p/U and additionally via the PPC method with position control of the piston of the pressure supply device DV1, as well as additionally or in the event of failure of the pressure transducer via the motor current and pressure volume characteristic of the system. The pressure control in the steering EHPS takes place via the volume control by way of path control of the piston of the piston-cylinder unit of the steering EHPS, for which the steering has at least one, advantageously an additional, preferably redundant, position sensor x/U, see FIG. 1A. The angle sensor can also be used as an alternative to the position sensor a/U of the electric motor of the pressure supply device, which is also designed redundantly.

All components of the vehicle axle are controlled by the superordinate control and regulating unit M-ECU. Optionally, instead of an actuating device BE, an electric brake pedal for brake-by-wire and an electric accelerator pedal e-accelerator pedal can also be provided.

FIG. 1a shows a hydraulic diagram of the vehicle axle according to FIG. 1 with only one pressure supply device DV1, this having two control and regulating units DV-ECU1 and DV-ECU2, each control and regulating unit controlling a 3-winding system of the drive so that even if a control unit or a 3-winding system fails, the pressure supply can be operated with reduced dynamics and reduced maximum pressure.

The steering system EHPS has an inlet valve EVS1, EVS2, EVS3, EVS4 for each pressure chamber, the piston for steering support being adjustable by opening the switching valves. The EHPS control follows in such a way that the EVS1 valve and the EVS4 valve are opened to move the piston in the direction of wheel R2, while EVS2 and EVS4 are closed. When adjusting in the direction of wheel R1, the EVS2 and EVS3 valve is opened and the EVS1, EVS4 valve is opened. If the valves leak, the steering can be controlled using an emergency control method in such a way that the leakage rates are determined via the piston of the pressure supply device and the valves are intelligently controlled so that steering in both directions is possible despite the leakage. For additional redundancy, steering modules are provided on a plurality of axles.

FIG. 1B shows an additional embodiment for the vehicle axle according to FIG. 1A, a purely electrohydraulic brake being provided and the pressure supply device being connected only to the steering module. In contrast to the steering system according to FIG. 1A, the steering system EHPS has only one switching valve EVS1.

FIG. 1C shows an additional possible embodiment of the vehicle axle according to the invention, in which two pressure supply devices DV1 and DV2 are provided, each of which has two control and regulating units DV-ECU1 and DV-ECU2. Each control and regulating unit DV-ECU1 and DV-ECU2 controls its own phase or winding system of the motor M1, M2, so that the control and regulating units are inherently redundant. In addition, additional redundancies can be provided if the voltage supply and/or the signal lines for the control and regulating units DV-ECU1 and DV-ECU2 are designed to be redundant, i.e., a supply from two vehicle electrical systems and/or two voltage levels BN1, BN2 is provided or the data lines DS1, DS2 designed redundantly.

The pressure supply device DV1 is thus provided for pressure control in the wheel brakes RB1 and RB2. The pressure supply device DV2 for the pressure control or pressure supply of the steering EHPS. The two hydraulic systems are separated from each other so that a fault in one system cannot affect the other. The functioning of the steering is described in FIG. 1A.

FIG. 2 shows a basic circuit diagram of a second possible embodiment of the vehicle axle 100. The wheel brakes RB1 and RB2 of the axle 100 are formed by hydraulically supported electromechanical brakes H-EMB, with which a braking force can be built up in control operation not only by means of the pressure supply device DV1 but also by means of its own electric drive. This can be used as a support or in the event of a total failure. In addition, the traction drives EM1 and EM2 can be used to produce a deceleration of the vehicle wheels R1 and R2 either in a supporting manner or alone. The control and regulating unit ECU DV can be designed identically to that in the previously described embodiments. In other words, it can be designed redundantly in itself. Optionally, a second pressure supply device can also be provided as a replacement for the pressure supply device DV1 in an emergency. The components are controlled by the superordinate control and regulating unit M-ECU, with an actuating unit BE optionally being provided, as already described above. This can either have a purely electronic brake pedal (e-brake pedal), or it has a piston-cylinder unit, the piston of which can be adjusted in an emergency to build up pressure in the wheel brakes using the brake pedal, so that emergency braking is still possible. This braking force produced by the foot can be supported by the traction motors EM1, EM2 and the motors of the hydraulically supported brakes H-EMB.

Of course, a steering EHPS and/or clutch and gear selector can also be provided on the axle in this embodiment, as will be described in the following figures. Another pressure supply device (not shown) can also be provided, which is used for redundant pressure supply to the wheel brakes H-EMB and/or for pressure supply to other components such as the steering EHPS and/or clutch and gear actuators. The pressure supply devices can also take over the supply of all components of the vehicle axle in the event of a fault in a pressure supply device.

FIG. 2A shows the hydraulic lines and valves of the vehicle axle as shown and described in FIG. 2. In control operation, the de-energized closed separating valve TV is open, the pressure control in the wheel brakes RB1, RB2 taking place in multiplex operation and/or simultaneously by means of the pressure supply device DV1 and the switching valves SV1, SV2. The pressure control can take place via the pressure measurement using the pressure transducer p/U. However, the motor current i of the motor M1 and the rotor position a and optionally the temperature of the motor and the pressure-volume characteristic curve can also be used in a supporting manner or in the event of a failure of the pressure transducer. In the event of a total failure of the pressure supply device DV1, the separating valve TV closes and the de-energized open separating valve TVBE opens, so that a pressure can be built up in the wheel brakes by means of the actuating device BE.

FIG. 2B shows a cross-sectional view through a hydraulically supported electromechanical brake H-EMB, which can be connected to the pressure supply device DV1 via a hydraulic connection HL-DV1, so that a force can be applied to the brake disks either via the hydraulics and/or the electric motor EM. The rotary movement of the electric motor is transferred into a linear movement via a gear G and produces the force FEM on the wheel brake. The transmission G is preferably designed to be self-locking, so that the parking brake functions safely when the vehicle electrical system fails. In addition to the electric motor, a hydraulic force $F_{hyd}$ is produced via the pressure supply. Depending on the embodiment of the EM as a brush motor or a brushless motor with lower or higher power, the dynamics of the braking torque change and the additionally available braking torque can be determined by the H-EMB by appropriate design of the components and matched to the hydraulic brake.

FIG. 3 shows an additional possible embodiment of a vehicle axle according to the invention, which has the following features:
- Dual clutch transmission (in particular 2-speed for e-vehicles),
- Additional torque vectoring module TVM, e.g., eTwinster-x solution from GKN®, module integrated or separate in the 2-speed transmission;
- Torque vectoring can be solved technically in different ways; it is also possible that the torque vectoring module TVM is part of the manual transmission;
- Transmission lock GS as an alternative to the parking brake; this results in a redundancy through pressure supply with locked pressure through closed switching valve SV (see hydraulic parking brake—EP 2137427 A1), and additionally through electric motor EM, which can be used for a certain time, since electric vehicles have a very large battery capacity;
- Manual transmission can also be AMT (PCT/EP2017/054643)

In the vehicle axle shown in FIG. 3, the pressure supply or control takes place in the wheel brakes R1, R2 and the drive train: a) manual transmission SG, b) torque vectoring TVM, transmission lock GS by means of the pressure supply device DV1. Optionally, a second pressure supply device DV2 can be provided to increase the reliability of the components.

The brake pedal and the e-accelerator pedal supply the input signals for the superordinate control and regulating unit M-ECU. The valve assembly HCU with the valves, not shown, controls the activation of the individual components.

The brake pedal can be designed as a pure e-brake pedal and thus only supplies sensor signals. Optionally, it is also possible to provide an actuating device BE with a brake pedal and, for example, with a master cylinder and hydraulic simulator, so that it is possible to establish a hydraulic connection to the HCU. This advantageously results in a fall-back level in which the vehicle driver can produce brake pressure in the wheel brakes directly via the brake pedal, as has already been described above.

The motor in the pressure supply device DV1 can be designed as a 6-phase motor, two separate output stages, which each energize half the motor windings being provided. This means that if an output stage ECU-DV1 fails, 50% of the total engine power can still be provided.

The manual transmission SG can be actuated by means of two hydraulically operated multi-plate clutches. However, other hydraulically actuated switching elements are also possible, such as hydr. actuated gear selector, hydr. activated freewheels, etc.

The electric motor EM advantageously communicates partly directly with the control and regulating unit SG-ECU of the manual transmission SG.

Alternatively, a steering EHPS, as used in the embodiments described above, can also be provided for the vehicle axle according to FIG. 3.

FIG. 3A shows a possible embodiment in which the valves of the HCU according to FIG. 3 are shown. The de-energized open switching valves SV1, SV2 are used, as already described, for controlling the pressure in the wheel brakes. The pressure build-up and pressure decrease takes place via the switching valve SV1, SV2, the pressure control for each wheel taking place in multiplex operation (MUX).

The actuation of the clutches in the manual transmission SG takes place via a preferably de-energized closed valve SGV1, SGSV2 for pressure build-up and a de-energized closed valve SGVA1, SGVA2 for pressure reduction. The pressure can optionally be controlled directly via the pressure supply unit DV1. Alternatively, the pressure in the manual transmission SG can also be controlled by high-frequency cycling of the valves SGV1, SGSV2, SGVA1 and SGVA2. Two pressure transducers can be used to control the pressure in the manual transmission.

The torque vectoring HS-TV is actuated via the solenoid valve MV-TV. The actuation of the transmission lock GS takes place via a valve SVGS, which is preferably closed when it is de-energized.

The brake pedal with path simulator WS can be connected to the hydraulic circuit of the vehicle axle via the solenoid valve TVBE.

The pressure supply device DV1 can be separated from the other components by means of the de-energized closed valve TV.

The redundancy of the motor control by means of the two control and regulating units DV-ECU1 and DV-ECU2 has already been explained in detail in the embodiments described above. Each sub-ECU controls three motor phases and detects the signals of temperature T, phase current i and rotor angle α. If one sub-ECU fails, the other ECU can record all signals and control the motor with approx. 50% overall performance, which is sufficient for the predominant and relevant braking maneuvers.

FIG. 3B shows a possible embodiment of a vehicle with two vehicle axles A1 and A2 according to the invention, each of which is supplied by its own pressure supply device DV1 and DV2. The axle A2 is not shown. The connection module VM enables the two hydraulic circuits of the two axles A1 and A2 to be connected to one another. Thus, if one pressure supply device fails, the other still intact pressure supply device can take over the pressure control for all components of the vehicle, which results in a high level of fault tolerance and redundancy. The connection module VM also enables a connection to the reservoir VB. The internal structure of the connection module is not shown in detail here. In a simple embodiment, however, it is possible for only three switching valves to be sufficient.

Additional hydraulically supported parking brakes H-EMB are installed on the wheel brakes. Their function has already been described in detail in FIG. 2.

A reservoir VB supplies the pressure supply device DV1 with hydraulic fluid and it can be subsequently delivered. A VB2 with separate chambers K1 and K2 supplies the pressure supply device DV2 with hydraulic fluid and pressure can be released into the reservoir via the connection module VM. In contrast to axle A1, a pressure release from the hydraulic circuit of axle A2 is necessary because axle A2 does not have an actuating unit BE, which is typically designed hydraulically with a separate reservoir (not shown). An overpressure in the hydraulic circuit of axle A1 can thus escape via the actuating unit BE. The actuating unit BE is connected to the hydraulic circuit of axle A1 via a de-energized open valve TVBE, so that if both pressure supply devices fail, a brake pressure can still be built up in the wheel brakes of axle A1.

The pressure supply and control of the manual transmission is described in detail in FIG. 3A. In this respect, reference is made to the statements made there. In contrast to FIG. 3A, a media separation MTK is optionally provided between the brake circuit and the transmission circuit. The optional media separating piston MTK enables a different medium to be used for actuating the transmission than for actuating the brake. A separate reservoir VB3 must therefore be used, into which the volume is drained when the clutch is activated. This reservoir is in turn connected to the MTK module.

Another difference between FIG. 3B and FIG. 3A is that an H-EMB is used. This mode of operation is described in detail in FIGS. 2a and 2b. In addition, additional hydraulic actuators for torque vectoring HS-TV are provided, which are controlled via solenoid valve(s) MV-TV. The torque vectoring module HS-TV can be integrated in the transmission or designed separately (see dashed line)

FIG. 3C shows an additional possible embodiment in which there is no actuating device BE. This corresponds to a vehicle structure with a pure electric brake pedal for fully autonomous driving. Here the connection module is designed in such a way that pressure can be released from the hydraulic circuits of both axles A1 and A2 into the reservoir VB. In addition, the pressure supplies DV1 and DV2 are connected to the reservoir VB, a separate chamber K2, K3 being assigned to each pressure supply. Both pressure supplies can be subsequently delivered from the chambers K2 and K3 or, as an alternative, also be subsequently delivered via the VM module via the chamber K1. This creates an additional redundancy and only one reservoir is required for all pressure supplies.

FIG. 3D shows an additional possible embodiment of a vehicle axle with two pressure supply units DV1 and DV2. One pressure supply device DV1, DV2 each controls a wheel brake RB1, RB2 and part of the manual transmission actuator SG. The wheel brakes and manual transmission actuations are connected to the respective pressure supply unit via solenoid valves, which are preferably open when de-energized. Optionally, at least one media separating piston MTK can be installed so that the brakes can be operated with a different hydraulic medium than the manual transmission SG. To actuate a wheel brake, the assigned switching valve SV1, SV2 is opened and the valve of the assigned transmission actuation is closed. To actuate the transmission SG, the valve switching is reversed. Braking has priority over shifting the manual transmission SG.

Since switching is very seldom used on a vehicle axle, it can be assumed that the pressure supply device is permanently connected to the respective wheel brake during the pressure modulation during braking. Shifting can take place during braking phases with constant pressure or after braking.

The connection module VM enables the two hydraulic circuits to be connected. A common reservoir VB with separate chambers K1, K2 and K3 supplies the two pressure supply devices DV1 and DV2.

Although the system costs are higher compared to the embodiment according to FIG. 3B, the following advantages still outweigh the disadvantages:

- The two pressure supply devices DV1 and DV2 represent a total redundancy without restrictions;
- There are no restrictions in pressure control in the brake, since multiplexing, i.e., supplying two wheel brakes with one pressure supply device, is not necessary. The brake pressure can be permanently controlled by the associated pressure supply device DV1 or DV2 when the switching valve SV1 or SV2 is open;
- If a pressure supply device DV1, DV2 fails, the connection module VM makes it possible to operate both circuits with the pressure supply device that is still functional. There are no restrictions in the pressure level;
- One switching valve is sufficient on each of the switching elements in the manual transmission SG; no pressure transducers are also required;
- The actively adjustable volume in the pressure supply device can be somewhat lower.

FIG. 3E shows an additional possible embodiment in which the pressure supply device DV1 has a double stroke piston DHK, which is shown and described in detail in FIG. 5. In contrast to the previous embodiment, each wheel brake has an outlet valve AV1 and AV2 with an optional pressure transducer between the switching valve and the wheel brake. This has a number of advantages:

- Thus, a pressure supply in both piston stroke movements is possible, which means that an unlimited volume budget is available and a shorter piston stroke is possible;
- It is possible to connect the two hydraulic circuits, but also to separate them;
- Simultaneous pressure build-up and reduction possible in one stroke direction, particularly advantageous for the simultaneous actuation of the two clutches of a dual clutch transmission;
- Motor downsizing is possible by connecting the two hydraulic chambers of the double stroke piston and reducing the hydraulic effective areas with an effect on the torque requirement of the electric motor of the pressure supply device;
- Closed circuits, i.e., the entire control of the brakes and clutches takes place via the DHK unit and can therefore be diagnosed very well
- with no connection module VM necessary.
- Dispensing with or reducing the size of the reservoir when separating media, since little or no volume is lost in the clutch
- Pressure reduction via AV1, AV2 via PWM control with/ without pressure transducer or double-stroke piston pressure supply system in the reservoir VB, thus additional degrees of freedom in the pressure control of clutches and brakes FIG. 3F shows an embodiment for a vehicle with two vehicle axles A1 and A2 according to the invention, the hydraulic circuits of which are connected to one another via two hydraulic lines HL1 and HL2, each with a de-energized closed valve SVHL1, SVHL2. An electric motor EM, a manual transmission SG, wheel brakes RB and torque vectoring HS-TV are installed on both axles A1 and A2. It is also possible to install only wheel brakes on the axle A2. This results in the following advantages:

As a rule, the valves of a pressure supply device DV1, DV2 are controlled by the ECU of the respective axle. However, if this ECU fails, the connecting valve can no longer be activated. In this embodiment there are two connecting valves SVHL1 and SVHL2, which are each controlled via the associated ECU. This ensures that the two hydraulic circuits can be connected even if an ECU fails;

if only one pressure supply device DV1, DV2 fails, for example due to a jammed spindle, but the associated ECU is still functioning, both connecting valves can be opened so that the total throttle losses are lower.

FIG. 4 shows a possible embodiment of a pressure supply device DV1 with two control and regulating devices DV-ECU1 and DV-ECU2. The pressure supply device has an electric motor M1, the rotor R of which adjusts a spindle SP which is connected to a piston KB. By adjusting the piston KB, a pressure can be built up in the pressure chamber DR, which can be passed into a brake circuit BK via the separating valve TV. The piston is sealed by a plurality of seals in the cylinder, with a hydraulic line leading to the reservoir between the seals. This means that the pressure supply is still fully operational and redundant even if a seal fails. The pressure chamber DR is connected to the reservoir via a check valve. Thus, the pressure supply can subsequently deliver. Each of the two control and regulating devices DV-ECU1 and DV-ECU2 are connected via 1×3 phase lines with separate winding or phase systems of motor M1, so that if one control and regulating device or winding system fails, motor M1 still has the other winding or phase system and the other control and regulating device can be operated, even if only about half the torque can then be produced by means of the drive M1. One or both control and regulating device(s) has or have sensors for determining the temperature T, the motor current i and the rotor angle α. To achieve a high level of availability, not only are the control and regulating devices DV-ECU redundant, but also power supplies BN1, BN2 and data and control lines DS1 and DS2 are provided twice. The power supplies BN1 and BN2 can, for example, be different voltage levels of a vehicle electrical system or separate vehicle electrical systems.

FIG. 5 shows a possible embodiment of a pressure supply device DV designed as a double-stroke piston with 2 pressure chambers and different areas A1 and A2, the area ratio A1/A2 preferably being between 1.5 and 2.5. The DV also has two control and regulating devices DV-ECU1 and DV-ECU2. The pressure supply device has an electric motor M1, the rotor R of which adjusts a spindle SP which is connected to a piston KB. By adjusting the piston KB, a pressure can be built up in the pressure chamber DR, which can be passed into a brake circuit BK via the separating valve TV. The piston is sealed by a plurality of seals in the cylinder, a redundant, diagnosable sealing system being created as with the pressure supply device. In the pressure supply device, too, a hydraulic line leads to the reservoir between the seals. This means that the seals can be diagnosed and the pressure supply is still fully operational and redundant even if a seal fails. The pressure chambers DRx and DRx are connected to the reservoir via check valves and valves xx and xx. This means that the pressure supply can draw volume from the reservoir in both pressure chambers Dxx and Dxx and a controlled pressure reduction is possible via both pressure chambers into the reservoir. The pressure reduction can take place via piston control or valve control, e.g., by PWM pulsing of the valves. The pressure transducers p/u are advantageously used for pressure control; the PPC regulation can additionally or alternatively be used. The two hydraulic circuits HKI and HK II are connected via one or more bypass valve(s), which are preferably designed to be closed when de-energized. Thus, the pressure build-up in HK1 and HK2 can take place in the forward and backward stroke directions. In addition, the effective area of the piston in the forward and return stroke directions can be reduced because, when the bypass valve circuit is open, A1-A2 is effective in the forward stroke direction and A2 in the return stroke direction. In this way, the torque requirement for the electric motor can be reduced and costs can be saved, and the load on the transmission can be reduced due to lower axial forces. Each of the two control and regulating devices DV-ECU1 and DV-ECU2 are connected via 1×3 phase lines with separate winding or phase systems of motor M1, so that if one control and regulating device or winding system fails, motor M1 still has the other winding or phase system and the other control and regulating device can be operated, even if only about half the torque can then be produced by means of the drive M1. One or both control and regulating device(s) has or have sensors for determining the temperature T, the motor current i and the rotor angle α of the electric motor. To achieve a high level of availability, not only are the control and regulating devices DV-ECU redundant, but also power supplies BN1, BN2 and data and control lines DS1 and DS2 are provided twice.

The power supplies BN1 and BN2 can, for example, be different voltage levels of a vehicle electrical system or separate vehicle electrical systems.

FIG. 6 shows a brake pressure control in the event of a failure of the pressure transducer DG, with a control of the motor torque $M_{Mot}$ and thus the control of the pressure p being carried out by measuring the motor current $i_{phase}$ and evaluating the pressure-volume characteristic. The motor temperature T is also taken into account, since the torque constant is reduced under temperature and thus has an influence on the proportionality factor kt*(1−Br %*ΔT) between motor torque $M_{Mot}$ and motor current $i_{phase}$. This advantageously results in a redundancy of the pressure measurement. This also means that a pressure transducer can be dispensed with. The control is calibrated by the pressure transducer and it is primarily controlled with current, path and pressure volume characteristic.

Where $$M_{mot} = kt * i_{phase} * (1 - Br \% * \Delta T)$$

kt: torque constant
$I_{phase}$: phase current
ΔT: temperature change in k
Br %: typical kt drop factor with increasing temperature
The PPC method (see introduction of DE102005055751B4 and DE102005018649B4) can be refined as a result and is used for brakes, steering, clutches, torque vectoring with clutch solution.

FIG. 8A shows a representation of an entire structural unit consisting of motor 22, pump Z, HCU and ECU, which is able to exercise pressure control and control for systems such as brakes, transmissions, etc. The main focus here is on the combination of motor and pump. The pump is arranged in the bearing flange 18 or attached to the HCU or ECU in a separate pump housing 40, as shown in the upper half of the figure. In FIG. 8A a version is shown which requires an additional motor bearing 20 in which the shaft 1 is mounted. As is usual, the motor is composed of a rotor 21, which is connected to the shaft 1 via the driver 10a. The rotor 21 is axially pretensioned by its force via a permanent magnet in the housing 30. This is a solution for the motor manufacturer who manufactures and tests the motor with housing 22 and stator and winding 23 and delivers it to the system supplier. The motor is tested with an auxiliary shaft without a pump. Thereafter, when the shaft is removed, the rotor is centered by the axial magnetic force, so that the shaft 1 can then be assembled with the rotor during final assembly. The drive housing must also be joined and fastened here with the flange 18 at 25a-shown in the lower half of the figure—e.g., with springs, which are attached in segments over three connections. A housing seal 31 is also necessary here. It can be fastened by caulking, at 25 from the engine flange with HCU or ECU, see upper half of the FIG. 28. The pump version with pump housing is shown here. The motor is shown here as a brushless motor that needs a motor sensor for commutation and control of the volume delivery of the pump. This motor sensor is arranged at a distance from the drive housing 22, a sensor shaft 26, which is arranged or attached to the drive shaft 1, carrying a sensor target 27. This target 27 acts on the sensor element 28, which is arranged on the circuit board of the ECU. The winding is connected to the ECU via contact bars 24.

The motor with bearing flange 18 can be connected directly to the hydraulic housing HCU, which includes valves or other hydr. components to be connected to the pump. If this is not the case, a connection of the drive housing 22, 18 directly to the housing of the ECU is possible.

It is also possible to arrange the gear pump Z in a pump housing 40 which is connected directly to the hydraulic housing HCU, as is shown in FIG. 8A in the upper half of the drive shaft 1. Before the assembly of the pump housing 40 and the hydraulic housing HCU or the pump housing 40 and the ECU, the gear pump Z is first integrated or mounted in the pump housing 40, the rotor 21 then being pressed onto the shaft 1 and then assembled with the bearing 20. Here, the tensile force of the magnet 30 can also act on the rotor 21 and the bearing 20, so that the bearing acts like a four-point bearing. The motor housing 22 is thus connected to the gear pump Z and its pump housing 40 and, in the next step, can be connected to the hydraulic housing HCU or the electronics housing ECU. The fastening screw 41 is used for this. The shaft 1 is previously centered in the outer disks 7.1 and 7.2, so that the pump housing 40 is centered with the shaft 1 before the screw connection to the hydraulic housing HCU or the electronics housing ECU.

The pressure supply device according to FIG. 8B uses a 2-stage pump with a long sliding or rolling bearing, which does not require a separate motor bearing. Accordingly, the motor structure with the housing is simplified. The rotor 21 is seated with the driver 10a on the motor shaft and is axially connected to the locking ring. The pump housing protrudes slightly into the HCU here.

The invention claimed is:
1. A brake system comprising:
a vehicle axle having the following components:
hydraulically operating wheel brakes;
at least one pressure supply device, driven by an electric motor drive, for pressure regulation in the wheel brakes;
at least one electronic control and regulating unit that is assigned to the pressure supply device; and
at least one electric traction motor configured for driving and braking a vehicle wheel or the vehicle axle;

a superordinate control and regulating unit, not located on the vehicle axle, and configured for controlling and/or regulating the at least one pressure supply device and the at least one traction motor;

wherein:
a pressure supply device of the at least one pressure device is provided for two wheel brakes of the vehicle axle, with the pressure supply device supplying pressure to both wheel brakes;

and/or two pressure supply devices comprising the at least one pressure supply device are provided, each for one wheel brake of the vehicle axle, with each of the two pressure supply devices supplying pressure to one wheel brake;

wherein the superordinate control and regulating unit is configured to control, in addition to a braking function, at least one other vehicle dynamics function of the vehicle, including steering and/or damping and/or roll stabilization.

2. The brake system according to claim 1, wherein the at least one pressure supply device has a piston-cylinder unit, the piston of which is adjusted via a spindle drive by an electric motor drive for pressure control in the wheel brakes.

3. The brake system according to claim 1, wherein the pressure supply device includes a rotary pump in the form of a gear pump, which is adjusted by an electric motor drive for pressure control in the wheel brakes, wherein, the rotary pump is a gear pump that is single-stage or multi-stage with multiple hydraulically arranged stages in series;

and/or wherein the gear pump is arranged or integrated in a motor housing of the electric motor drive, at least partially within a rotor of the electric motor drive;

and/or wherein the rotary pump and its electric motor drive, valves, and pressure transducer are combined or arranged in a structural unit, a module, or a housing, forming a pressure supply device;

and/or wherein a drive or rotor of the electric motor drive of the rotary pump runs dry or is sealingly separated from hydraulic medium to be conveyed by the rotary pump by means of at least one seal;

and/or wherein a second pressure supply device is provided, which is designed as a piston-cylinder unit.

4. The brake system according to claim 1, wherein one or more components or their subcomponents of the at least one pressure supply device and/or the at least one electronic control and regulating unit is/are redundant, and/or wherein in an event of partial or complete failure of the at least one pressure supply device and/or the at least one electronic control and regulating unit, a braking force is enabled to be generated on the vehicle axle or at least one wheel by the one or more components, an actuating device, an electric traction motor, and/or at least one additional brake unit that are still able to function;

and/or wherein the at least one electronic control and regulating unit controls separate windings of the electric motor drive;

and/or wherein at least one component of the at least one electronic control and regulating unit is electrically supplied via two supply networks and/or supply voltages, and/or signal lines are designed redundantly.

5. The brake system according to claim 1, wherein two pressure supply devices comprising the at least one pressure supply device are provided, which are provided during control operation for pressure regulation and/or pressure supply in different components of the vehicle axle, and in an event of failure and/or partial failure of a first one of the two pressure supply devices, a second one of the two pressure supply devices takes over the pressure regulation and/or pressure supply of at least one component assigned to the first one of the two pressure supply devices.

6. The brake system according to claim 1, wherein the vehicle axle is a front axle that has a power-assisting steering device.

7. The brake system according to claim 1, wherein the at least one pressure supply device together with a valve assembly and the at least one electronic control and regulating unit assigned to the at least one pressure supply device are combined into a module or assembly.

8. The brake system according to claim 1, further comprising an actuating device in the form of a brake pedal for pressure build-up in at least one wheel brake or in the form of an electric brake pedal, and control signals of the actuating device are used to control the at least one wheel brake.

9. The brake system according to claim 1, wherein each wheel brake of the vehicle axle is hydraulically connected to a respective one of the at least one pressure supply device, and wherein in an event of failure or partial failure of a first one of the at least one pressure supply and/or the one of the at least one electronic control and regulating unit assigned to the first one of the at least one pressure supply device, a second one of the at least one pressure supply device takes over pressure control for both wheel brakes of the vehicle axle by means of a connection module, wherein a hydraulic connection of the second one of the at least one pressure supply device with both wheel brakes is established via the connection module.

10. The brake system according to claim 1, wherein:
a first pressure supply device of the at least one pressure supply device is responsible for pressure control and/or pressure supply during control operation for all components of a first vehicle axle, and
a second pressure supply device of the at least one pressure supply device, which is responsible for pressure control and/or pressure supply during control operation for the components of a second vehicle axle, is used in case of failure or partial failure of the first pressure supply device for pressure control and/or pressure supply of one or more components of the first vehicle axle.

11. The brake system according to claim 1, wherein the at least one pressure supply device has two independent electronic control and regulating units or a dual-redundant control and regulating unit for controlling its electric motor drive.

12. The brake system according to claim 1, wherein the at least one pressure supply device has a double stroke piston, such that hydraulic medium is enabled to be conveyed and/or pressure is enabled to be built up or reduced in both directions of movement of the double stroke piston.

13. The brake system according to claim 1, wherein, during control operation, pressure reduction occurs by opening an outlet valve into a reservoir.

14. The brake system according to claim 1, wherein at least one of the wheel brakes is a hydraulically supported electromechanical brake, an electric parking brake, or an electromechanical brake, or wherein, in addition to the wheel brakes, an additional parking brake, a hydraulically supported electromechanical brake or an electromechanical brake has a braking effect on a wheel associated with the at least one of the wheel brakes.

15. The brake system according to claim 1, wherein the superordinate control unit is configured to determine braking torque to be produced by means of the wheel brakes during braking, with recuperation, and to control the at least one electronic control and regulating unit of the at least one pressure supply device accordingly and/or to control or use the at least one electric traction motor to build up a braking torque in addition to the brake torque produced by the wheel brakes.

16. The brake system according to claim 1, wherein either pressure control in at least one of the wheel brakes is carried out using at least one pressure sensor and/or by measuring a motor current of the at least one electric motor drive and controlling a position of a piston of the at least one pressure supply device, taking into account a temperature of the at least one electric motor drive.

17. The brake system according to claim 1, wherein an actuation unit is provided on a bulkhead facing an interior of the vehicle, wherein the actuation unit is connected to the superordinate control and regulation unit; or wherein no actuation unit is provided, in which case control of the brake system is carried out via the superordinate control and regulation unit.

18. A vehicle with at least one vehicle axle according to claim 1.

19. A method of operating a brake system for a vehicle with a vehicle axle that comprises hydraulically acting wheel brakes, at least one pressure supply device for pressure regulation in the wheel brakes, and at least one electric traction motor for driving and braking a vehicle wheel or the vehicle axle, and with a superordinate control and regulation unit, the method including:

using the superordinate control and regulation unit to control and/or regulate the at least one pressure supply device and the at least one electric traction motor by means of control signals to actuators of the vehicle, wherein the superordinate control and regulation unit controls, in addition to a braking function, at least one additional vehicle dynamics function of the vehicle, including steering and/or damping and/or roll stabilization.

* * * * *